United States Patent
Mitsuda et al.

[11] Patent Number: 5,936,763
[45] Date of Patent: Aug. 10, 1999

[54] OPTICAL FIBER AMPLIFIER, SEMICONDUCTOR LASER MODULE FOR PUMPING AND OPTICAL SIGNAL COMMUNICATION SYSTEM

[75] Inventors: Masahiro Mitsuda, Kyoto; Tomoaki Uno, Hyogo; Kiyoshi Fujihara, Osaka, all of Japan

[73] Assignee: Matsushita Electric Industrial Co., Ltd., Osaka, Japan

[21] Appl. No.: 08/968,578

[22] Filed: Nov. 13, 1997

[30] Foreign Application Priority Data

Nov. 15, 1996 [JP] Japan ................................. 8-304390

[51] Int. Cl.$^6$ ................................. G02B 6/28; H01S 3/30
[52] U.S. Cl. ............................ 359/341; 359/134; 359/160
[58] Field of Search ................................. 359/134, 160, 359/337, 341; 372/6, 70, 71

[56] References Cited

U.S. PATENT DOCUMENTS

| | | | |
|---|---|---|---|
| 4,964,131 | 10/1990 | Liu et al. | 372/6 |
| 5,187,760 | 2/1993 | Huber | 372/6 |
| 5,249,189 | 9/1993 | Sheps | 372/20 |
| 5,287,216 | 2/1994 | Chirravuri et al. | 359/341 |
| 5,500,764 | 3/1996 | Armitage et al. | 359/341 |
| 5,623,362 | 4/1997 | Mitsuda et al. | 359/341 |

FOREIGN PATENT DOCUMENTS 508880   9/1994   United Kingdom .

OTHER PUBLICATIONS

Metschke et al, Applied Physics B, vol. B62, #4, pp. 375–379; Abstract Only Herewith, Apr. 1996.

*Primary Examiner*—Nelson Moskowitz
*Attorney, Agent, or Firm*—McDermott, Will & Emery

[57] ABSTRACT

The optical fiber amplifier of this invention includes plural pump light sources for emitting pump light; a first wavelength multiplexer for receiving the pump light emitted by the pump light sources at plural input ports and wavelength multiplexing the received pump light, so as to generate wavelength multiplexed pump light and output the wavelength multiplexed pump light from an output port; a second wavelength multiplexer for receiving the wavelength multiplexed pump light at a first input port and receiving signal light at a second input port, so as to generate coupled light by coupling the wavelength multiplexed pump light and the signal light and emit the coupled light from an output port; and a rare earth-doped optical fiber for receiving the coupled light emitted from the output port of the second wavelength multiplexer and amplifying the coupled light. At least one of the pump light sources is a narrow-linewidth light source for emitting light with a laser linewidth of approximately 5 nm or less as the pump light.

17 Claims, 17 Drawing Sheets f=f₁ f=f₂ f=f₃ f=f₄

OPTICAL FIBER AMPLIFIER, SEMICONDUCTOR LASER MODULE FOR PUMPING AND OPTICAL SIGNAL COMMUNICATION SYSTEM

BACKGROUND OF THE INVENTION

The present invention relates to an optical fiber amplifier. More particularly, it relates to an optical fiber amplifier for providing large optical output power resulting from pump light generated by wavelength multiplexing. TECHNICAL REPORT OF IEICE (EDM 96-39, CPM 96-62, OPE 96-61, LQE 96-63) describes a conventional optical fiber amplifier whose optical output power is increased by multiplexing pump light. This conventional optical fiber amplifier will now be described with reference to FIGS. 19 and 20.

As is shown in FIG. 19, an erbium-doped fiber (hereinafter referred to as the EDF) 33 is connected, at its input, with an input optical fiber 31 for transferring signal light with an isolator 32 interposed therebetween, and is also connected, at its output, with an output photometric fiber 35 with an isolator 34 interposed therebetween. The input and the output of the EDF 33 are also connected with first and second wavelength division multiplexer (hereinafter referred to as the WDM) couplers 36 and 37, respectively. Each of the WDM couplers 36 and 37 is interposed in order to couple the signal light in a 1.55 µm band with pump light in a 1.48 µm band, which is one of the absorption wavelength bands of the EDF 33, with a small loss.

In this optical fiber amplifier, eight semiconductor lasers 1 are used as pump light source for the EDF 33. Among the eight semiconductor lasers 1 for optical pumping, four have an oscillation wavelength of 1.465 µm and the other four have an oscillation wavelength of 1.485 µm, and four are disposed at the input side of the EDF 33 and the other four are disposed at the output side of the EDF 33. Among the four lasers disposed at the input side, two have an oscillation wavelength of 1.465 µm and the other two have an oscillation wavelength of 1.485 µm. Output light of the two lasers having the same oscillation wavelength are coupled by a polarization coupler 41a, 41b, 41c or 41d. By adopting the polarization coupling, pump light in a TE mode and pump light in a TM mode having the same wavelength can be coupled without causing interference, resulting in decreasing a light loss.

The pump light with a wavelength of 1.465 µm and the pump light with a wavelength of 1.485 µm obtained by the polarization coupling are multiplexed by a wavelength multiplex coupler 36a or 37a, and then allowed to enter the EDF 33 by the first or second WDM coupler 36 or 37. FIG. 20 shows a spectrum of the wavelength-multiplexed pump light and a transmission wavelength band characteristic of the wavelength multiplex coupler 36a (37a).

In this manner, the optical fiber amplifier of FIG. 19 amplifies an optical signal input through the input optical fiber 31 by allowing the pump light from the four pumping lasers at the input side and the pump light from the other four pumping lasers at the output side to enter the EFD 33 in the two directions. Such a conventional optical fiber amplifier, however, cannot always provide output light with sufficiently large optical power.

SUMMARY OF THE INVENTION

The object of the invention is providing an optical fiber amplifier having larger output optical power, a semiconductor laser module for optical pumping and an optical signal communication system by adopting wavelength multiplex.

The optical fiber amplifier of this invention comprises plural pump light sources for emitting pump light; a first wavelength multiplexer for receiving the pump light emitted by the pump light sources at plural input ports and for wavelength multiplexing the received pump light, so as to generate wavelength multiplexed pump light and output the wavelength multiplexed pump light from an output port; a second wavelength multiplexer for receiving the wavelength multiplexed pump light at a first input port and receiving signal light at a second input port, so as to generate coupled light by coupling the wavelength multiplexed pump light and the signal light and emit the coupled light from an output port; and a rare earth-doped optical fiber for receiving the coupled light emitted from the output port of the second wavelength multiplexer and amplifying the coupled light, wherein at least one of the pump light sources is a narrow-linewidth light source for emitting light with a laser linewidth of approximately 5 nm or less as the pump light.

Alternatively, the optical fiber amplifier of this invention comprises a plurality of first pump light sources for emitting first pump light; a plurality of second pump light sources for emitting second pump light; a first wavelength multiplexer for receiving the first pump light emitted by the first pump light sources at plural input ports, so as to generate first wavelength multiplexed pump light by wavelength multiplexing the first pump light and output the first wavelength multiplexed pump light from an output port; a second wavelength multiplexer for receiving the first wavelength multiplexed pump light at a first input port and receiving signal light at a second input port, so as to generate coupled light by coupling the first wavelength multiplexed pump light and the signal light and output the coupled light from an output port; a rare earth-doped optical fiber for receiving the coupled light output from the output port of the second wavelength multiplexer at a first end and outputting the coupled light from a second end; a third wavelength multiplexer for receiving the second pump light emitted by the second pump light sources at plural input ports, so as to generate second wavelength multiplexed pump light by wavelength multiplexing the second pump light and output the second wavelength multiplexed pump light from an output port; and a fourth wavelength multiplexer for receiving the second wavelength multiplexed pump light at a first input port and inputting the second wavelength multiplexed pump light to the second end of the rare earth-doped optical fiber, wherein at least one of the first pump light sources is a narrow-linewidth light source for emitting light with a laser linewidth of approximately 5 nm or less as the first pump light, and at least one of the second pump light sources is a narrow-linewidth light source for emitting light with a laser linewidth of approximately 5 nm or less as the second pump light.

Furthermore, the semiconductor laser module for optical pumping of this invention comprises plural narrow-linewidth light sources for emitting pump light; plural filters for wavelength multiplexing the pump light emitted by the narrow-linewidth light sources; and an optical fiber for receiving the pump light through the filters and outputting wavelength multiplexed pump light from one end, the plural filters being slantly buried in the optical fiber, wherein each of the narrow-linewidth light sources emits light with a laser linewidth of approximately 5 nm or less as the pump light.

Moreover, the optical fiber amplifier of this invention comprises a semiconductor laser module for optical pumping which emits wavelength multiplexed pump light; a wavelength multiplexer for receiving the wavelength multiplexed pump light emitted by the semiconductor laser module for optical pumping at a first input port and receiving signal light at a second input port, so as to generate coupled light by coupling the wavelength multiplexed pump light and the signal light and output the coupled light from an output port; and a rare earth-doped optical fiber for receiving the coupled light emitted from the output port of the wavelength multiplexer and amplifying the coupled light, wherein the semiconductor laser module for optical pumping includes plural narrow-linewidth light sources for emitting pump light; plural filters for wavelength multiplexing the pump light emitted by the narrow-linewidth light sources; and an optical fiber for receiving the pump light through the filters and outputting the wavelength multiplexed pump light from one end, the filters being slantly buried in the optical fiber, and each of the narrow-linewidth light sources emits light with a laser linewidth of approximately 5 nm or less as the pump light.

Furthermore, the optical communication system of this invention comprises an optical signal transmitter for outputting an optical signal; an optical fiber amplifier for amplifying the optical signal; and an optical signal receiver for receiving the optical signal having been amplified by the optical fiber amplifier, wherein the optical fiber amplifier includes plural pump light sources for emitting pump light; a first wavelength multiplexer for receiving the pump light emitted by the pump light sources at plural input ports and for wavelength multiplexing the received pump light, so as to generate wavelength multiplexed pump light and output the wavelength multiplexed pump light from an output port; a second wavelength multiplexer for receiving the wavelength multiplexed pump light at a first input port and receiving signal light at a second input port, so as to generate coupled light by coupling the wavelength multiplexed pump light and the signal light and output the coupled light from an output port; and a rare earth-doped optical fiber for receiving the coupled light output from the output port of the second wavelength multiplexer and amplifying the coupled light, and at least one of the pump light sources is a narrow-linewidth light source for emitting light with a laser linewidth of approximately 5 nm or less as the pump light.

Alternatively, the optical communication system of this invention comprises an optical signal transmitter for outputting an optical signal; an optical fiber amplifier for amplifying the optical signal; and an optical signal receiver for receiving the optical signal having been amplified by the optical fiber amplifier, wherein the optical fiber amplifier includes a semiconductor laser module for optical pumping which emits wavelength multiplexed pump light; a wavelength multiplexer for receiving the wavelength multiplexed pump light emitted by the semiconductor laser module for optical pumping at a first input port and receiving signal light at a second input port, so as to generate coupled light by coupling the wavelength multiplexed pump light and the signal light and output the coupled light from an output port; and a rare earth-doped optical fiber for receiving the coupled light output from the output port of the wavelength multiplexer and amplifying the coupled light, and the semiconductor laser module for optical pumping includes plural narrow-linewidth light sources for emitting pump light; plural filters for wavelength multiplexing the pump light emitted by the narrow-linewidth light sources; and an optical fiber for receiving the pump light through the filters and outputting the wavelength multiplexed pump light from one end, the filters being slantly buried in the optical fiber, and each of the narrow-linewidth light sources emits light with a laser linewidth of approximately 5 nm or less as the pump light.

BRIEF DESCRIPTION OF THE DRAWINGS

FIG. 3B shows a transmission wavelength band (transmission characteristic) of a coupler element 2a, and FIG. 3C shows a spectrum of pump light coupled by the coupler element 2a;

DETAILED DESCRIPTION OF THE INVENTION

According to the present invention, through wavelength multiplex of narrow-linewidth pump light emitted by plural pump light sources and having different wavelengths, the total optical power of the pump light is increased.

In the case where pump light having different wavelengths are multiplexed by a wavelength multiplex coupler, a coupler loss is a significant problem. Also, it is well known that when a laser beam with a narrow linewidth is coupled with an optical fiber, stimulated Brillouin scattering is caused within the optical fiber due to a non-linear effect, resulting in causing a loss. Accordingly, in order to increase the optical power of pump light, various attempts have been made: For example, a drive current supplied to a pump light source is simply increased; or pump light with a wide linewidth are multiplexed as described above.

The absorption wavelength band of a rare earth-doped optical fiber is approximately 40 through 50 nm at most, and the spectral linewidth of a pump light source used in the conventional optical fiber amplifier is approximately 15 nm. In view of these facts, the number of kinds of oscillation wavelengths of a laser usable in the wavelength multiplex is limited to three or less.

The present inventors, however, have found that various advantageous results can be attained through the wavelength multiplex of narrow-linewidth pump light.

A "linewidth" herein means "a full width of a pump light spectrum at a level lower than the maximum by 10 dB". Also, a "narrow-linewidth light source" is herein defined as "a light source for emitting light with a linewidth of approximately 5 nm or less".

Now, preferred embodiments of the invention will be described with reference to the accompanying drawings.
(Embodiment 1)

A first embodiment of the invention will now be described referring to FIGS. 1 through 6.

Figure 1:
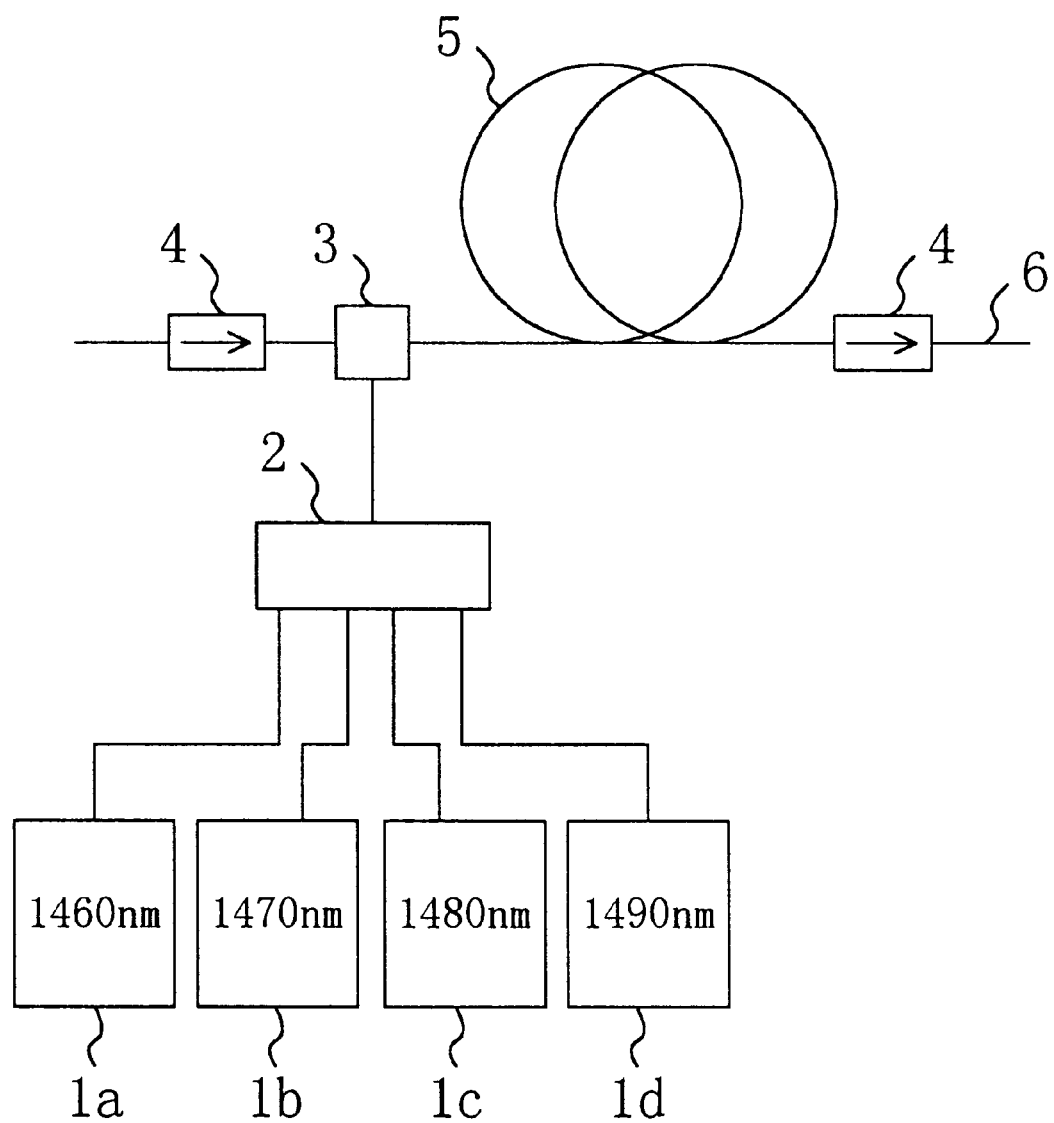
FIG. 1 is a diagram for showing the configuration of an optical fiber amplifier according to a first embodiment.

An optical fiber amplifier of FIG. 1 includes Fabry-Perot (FP) semiconductor lasers 1a, 1b, 1c and 1d each having a linewidth of 5 nm or less as plural pump light sources for emitting pump light. The central wavelengths of the semiconductor lasers 1a, 1b, 1c and 1d are 1460 nm, 1470 nm, 1480 nm and 1490 nm, respectively. These wavelengths are all included in a pump light absorption wavelength band of an erbium ion (ranging between 1450 nm and 1500 nm).

Figure 2A:
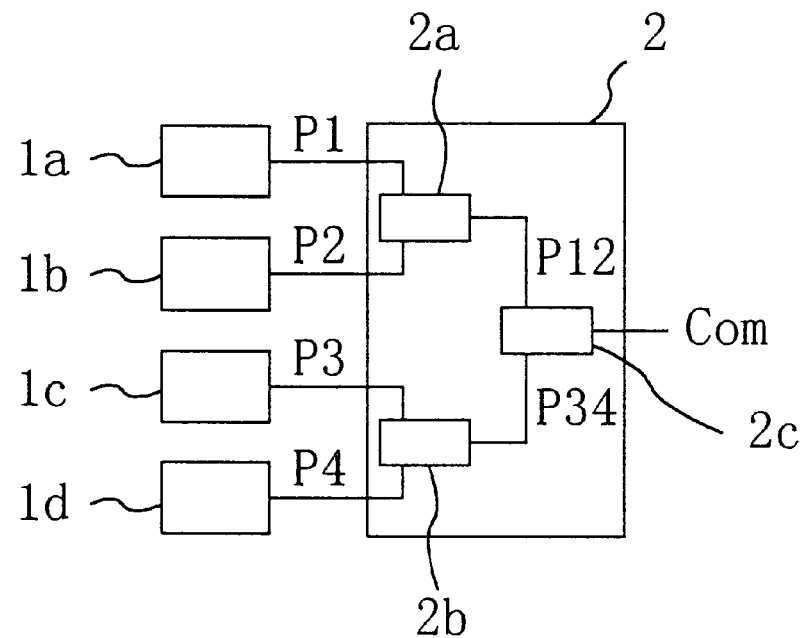
FIG. 2A is a diagram for showing the configuration of a first wavelength multiplex coupler 2.

In this optical fiber amplifier, the pump light emitted by the plural semiconductor lasers 1a through 1d are wavelength multiplexed by a first wavelength multiplex coupler 2. The first wavelength multiplex coupler 2 includes a plurality of couplers. FIG. 2A shows the configuration of the first wavelength multiplex coupler 2 of FIG. 1. As is shown in FIG. 2A, the wavelength multiplex coupler 2 includes a coupler element 2a, a coupler element 2b and a coupler element 2c. To the two input ports of the coupler element 2a, pump light P1 (with a wavelength of 1460 nm) emitted by the pump light source 1a and pump light P2 (with a wavelength of 1470 nm) emitted by the pump light source 1b are respectively input, and to the two input ports of the coupler element 2b, pump light P3 (with a wavelength of 1480 nm) emitted by the pump light source 1c and pump light P4 (with a wavelength of 1490 nm) emitted by the pump light source 1d are respectively input. Furthermore, to the two input ports of the coupler element 2c, pump light P12 coupled by the coupler element 2a and pump light P34 coupled by the coupler element 2b are respectively input.

Figure 2B:
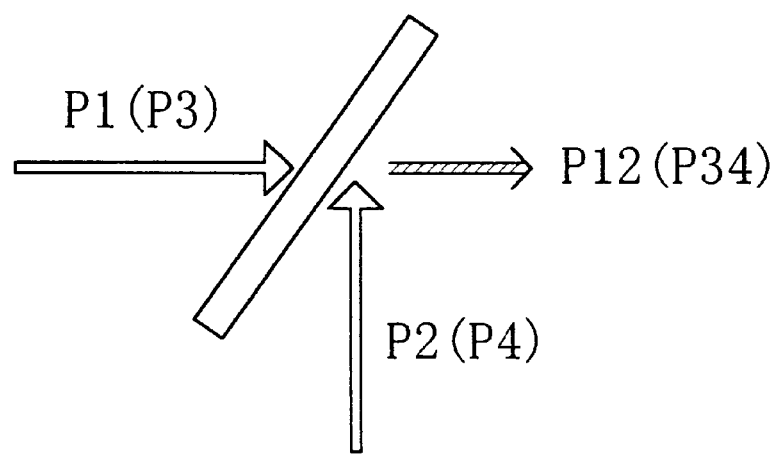
FIG. 2B is a schematic diagram of a main part of each coupler element.

FIG. 2B schematically shows the main part of each of the coupler elements 2a through 2c. Among the pump light P1 and P2 (or P3 and P4) input to the two input ports, one is transmitted through an interference filter and the other is reflected by the interference filter. The interference filter is required to have a characteristic of exhibiting a high transmittance against, for example, the pump light P1 and a high reflectance against the pump light P2. When there is a large difference in the wavelength between the pump light P1 and the pump light P2, the interference filter can comparatively easily attain this characteristic, but when the wavelengths of the pump light P1 and P2 are close to each other, it is necessary to make the transmission wavelength bandwidth of the interference filter sufficiently narrow. At this point, the pump light P2 is reflected by the interference filter, and the dependence of the reflectance on the wavelength is herein designated as a transmission wavelength band characteristic.

Figure 3A:
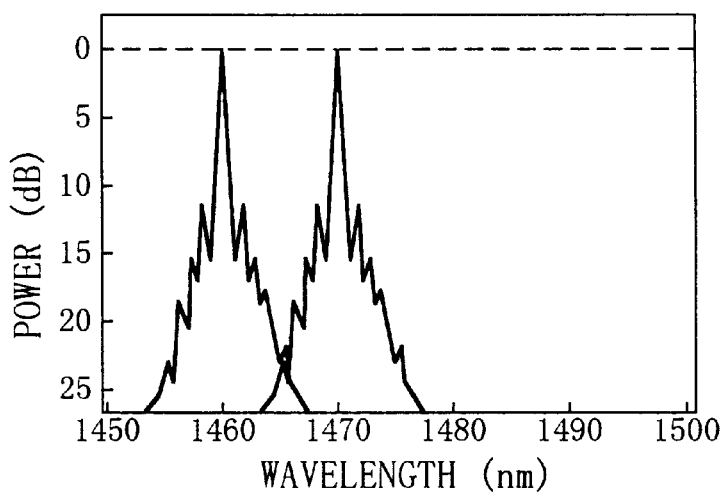
FIG. 3A shows pump light spectra of pump light sources 1a and 1b.
Figure 3B:
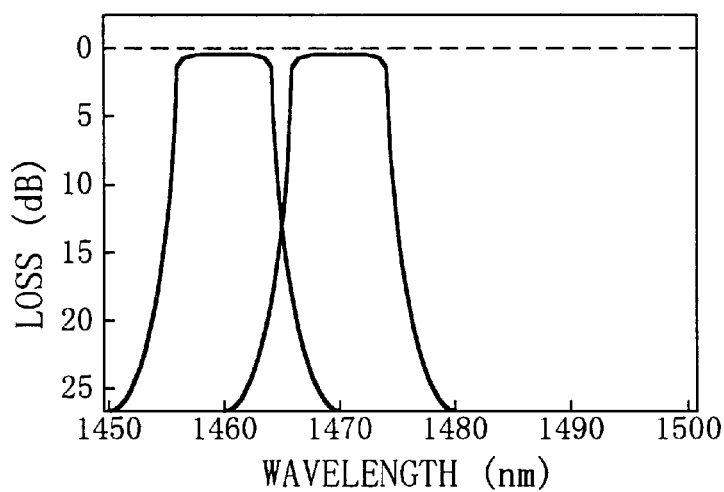
Figure 3C:
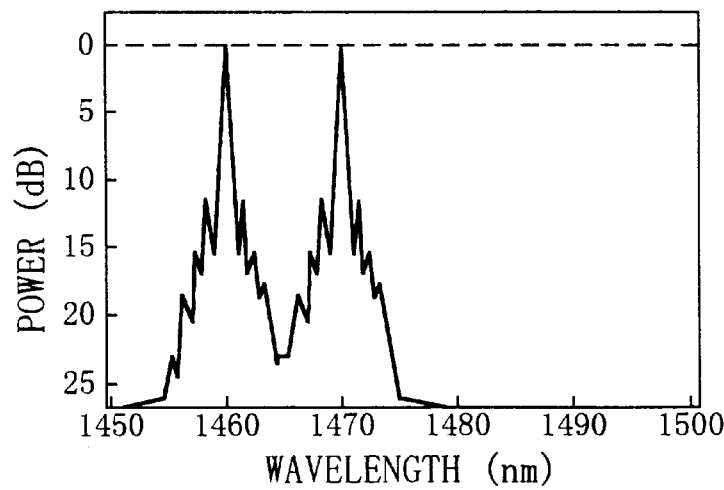
Figure 4A:
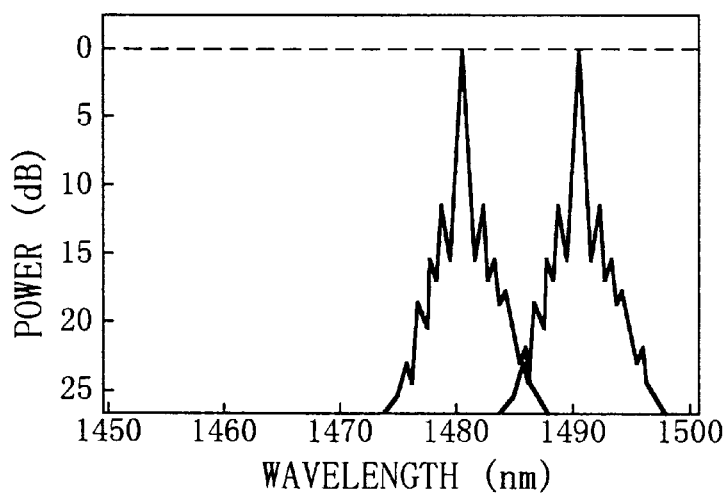
FIG. 4A shows pump light spectra of pump light sources 1c and 1d.
Figure 4B:
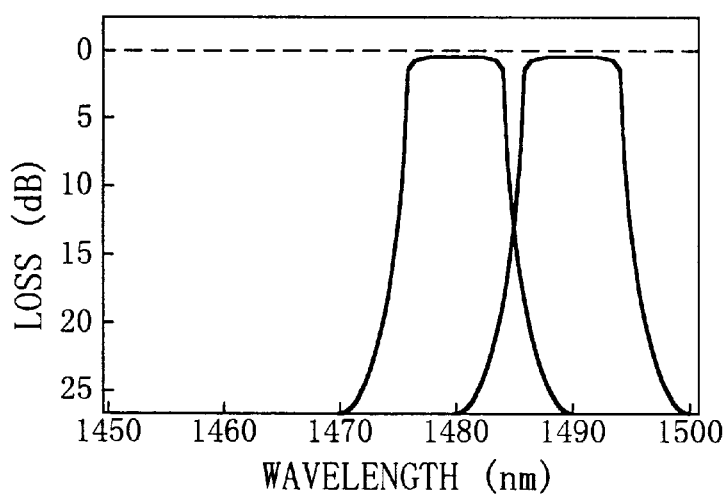
FIG. 4B shows a transmission wavelength band (transmission characteristic) of a coupler element 2b.
Figure 4C:
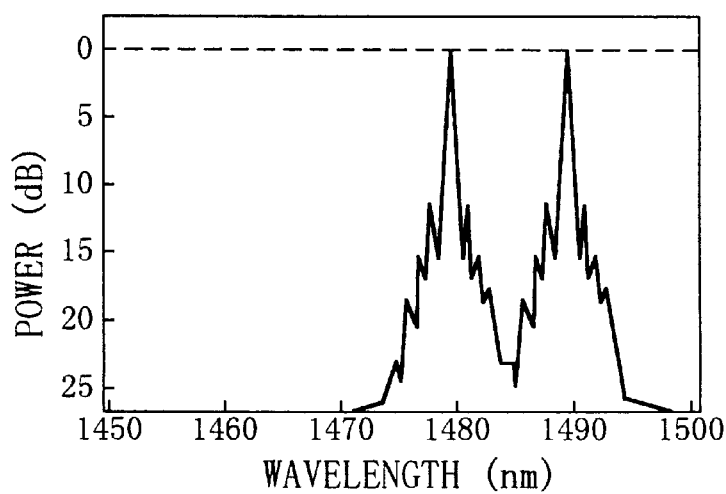
FIG. 4C shows a spectrum of pump light coupled by the coupler element 2b.
Figure 5A:
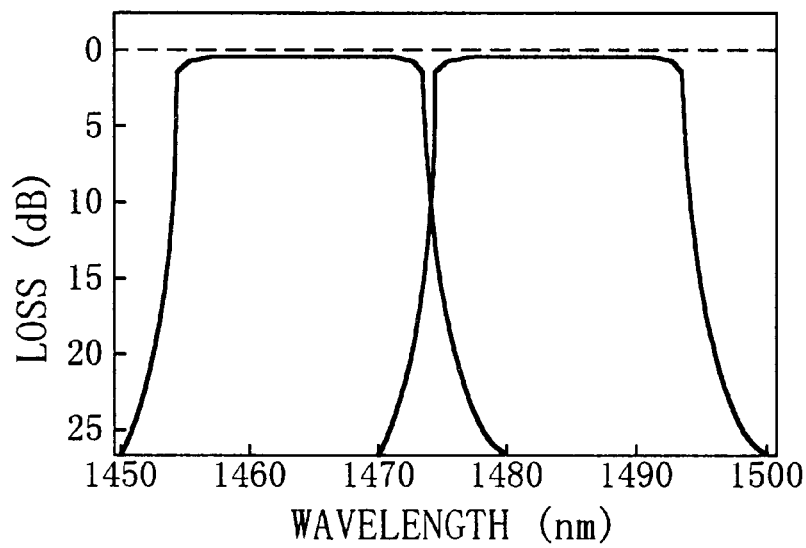
FIG. 5A shows a transmission wavelength band of a coupler element 2c.
Figure 5B:
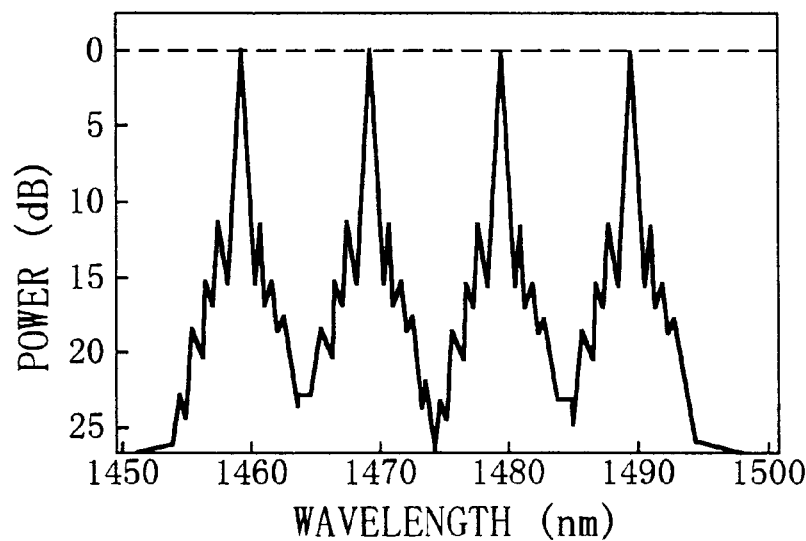
FIG. 5B shows a spectrum of pump light coupled by the coupler element 2c.

FIG. 3A shows pump light spectra of the pump light sources 1a and 1b, FIG. 3B shows a transmission wavelength band (transmission wavelength band characteristic) of the coupler element 2a, and FIG. 3C shows a spectrum of pump light coupled by the coupler element 2a. On the other hand, FIG. 4A shows pump light spectra of the pump light sources 1c and 1d, FIG. 4B shows a transmission wavelength band of the coupler element 2b, and FIG. 4C shows a spectrum of pump light coupled by the coupler element 2b. Furthermore, FIG. 5A shows a transmission wavelength band of the coupler element 2c and FIG. 5B shows a spectrum of pump light coupled by the coupler element 2c.

Figure 6:
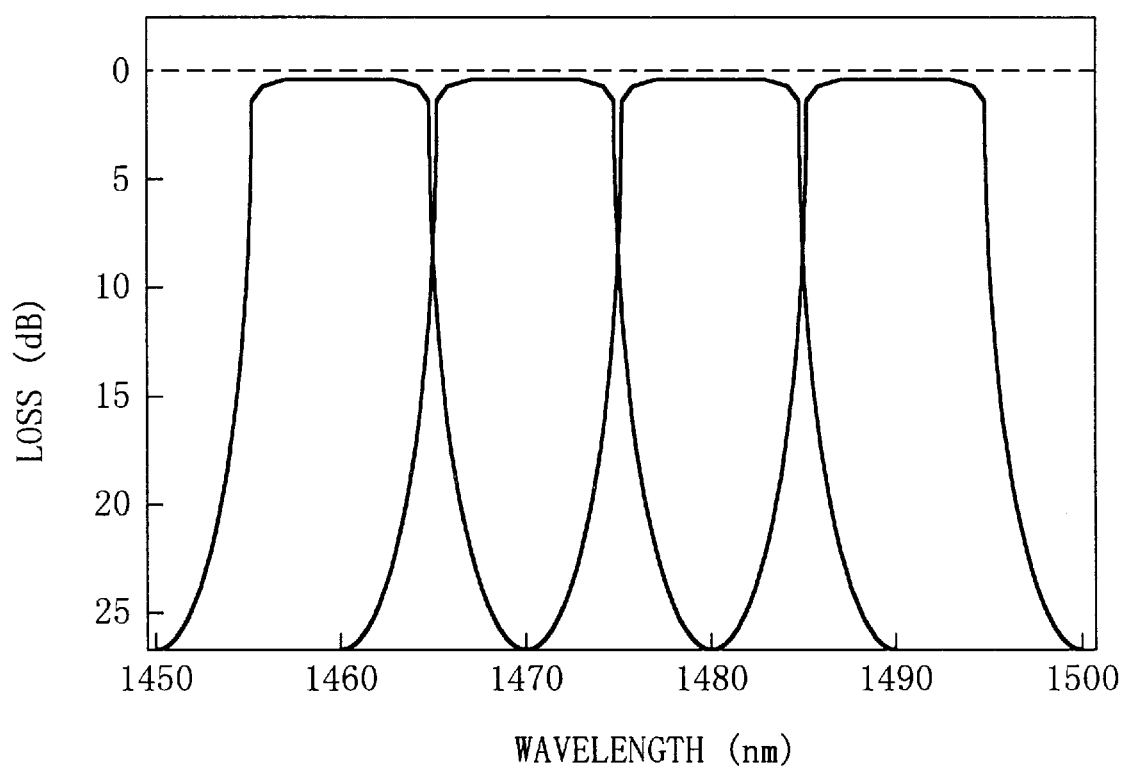
FIG. 6 shows a transmission wavelength band of the wavelength multiplex coupler 2.

As is understood from these drawings, the central wavelength of the input port of each coupler element accords with the central wavelength of the pump light input to the input port. Also, the transmission wavelength bandwidth of each input port is 8 nm. The transmission wavelength band of the wavelength multiplex coupler 2 is shown in FIG. 6.

In order to minimize a loss caused by insertion of a coupler, it is necessary to set the transmission wavelength bandwidth of the coupler to be small as compared with a difference in the wavelength between pump light to be coupled. In general, a coupler having a small transmission wavelength bandwidth causes a large loss as compared with a coupler having a large transmission wavelength bandwidth. For example, in a filter type coupler, it is necessary to increase the number of layers included in a dielectric multilayer film formed on a substrate in order to make small the transmission wavelength bandwidth. When the number of the layers included in the dielectric multilayer film is increased, the coupler loss is increased. When an optical fiber having a limited number of absorption wavelength bands is to be supplied with pump light having various wavelengths, it is naturally necessary to make small the difference in the wavelength between the pump light. When the difference in the wavelength between the pump light is made small, the loss caused by the insertion of the coupler is increased because it is necessary to make narrow the transmission wavelength bandwidth of each coupler element as is shown in FIG. 3B or 4B. However, the loss caused by a coupler having a small transmission wavelength band is decreased to be as small as possible in this embodiment by making the linewidth of the pump light narrow.

Referring to FIG. 1 again, the pump light emitted by the pump light sources 1a, 1b, 1c and 1d is coupled with an optical fiber by the wavelength multiplex coupler 2 with an insertion loss of 0.5 dB. The wavelength multiplexed pump light output from the output port of the wavelength multiplex coupler 2 is input to the first input port of a second wavelength multiplex coupler 3 through the optical fiber, so as to be coupled with signal light in the 1.55 $\mu$m band having been input to the second input port of the second wavelength multiplex coupler 3.

Coupled light output from the output port of the second wavelength multiplex coupler 3 enters an erbium-doped fiber 5. The erbium-doped fiber 5 is pumped by the wavelength multiplexed pump light in the 1.48 µm band, so that the signal light in the 1.55 µm can be amplified to be output from an optical fiber 6. At the both ends of the erbium-doped fiber 5, optical isolators 4 are inserted for the purpose of preventing oscillation of the signal light due to a high gain.

Each of the semiconductor lasers used in this embodiment has output optical power of 100 mW. The total optical power obtained by coupling the pump light emitted by the four semiconductor lasers by using the first wavelength multiplex coupler 2 is 360 mW, with the insertion loss of 0.5 dB subtracted. The used erbium-doped fiber 5 has a length of 50 m. The output optical power of the signal light obtained when the incident power is 0 dBm is 250 mW, and the conversion efficiency is 70%.

In this manner, by using a plurality of narrow-linewidth lasers each having a linewidth of 5 nm or less as the pump light sources, the pump light is wavelength multiplexed in this embodiment. Therefore, the erbium-doped fiber 5 can be pumped with high output power. As a result, an input signal can be largely amplified.

Although the Fabry-Perot lasers are used as the narrow-linewidth pump light sources in this embodiment, the similar results can be attained by a super luminescence light source, a surface emitting laser or an external resonator type laser using fiber grating as far as it has large output optical power and a narrow linewidth. In particular, the external resonator type laser using fiber grating can exhibit an effect that the central wavelength of the pump light is hardly shifted from each central wavelength of the wavelength multiplex coupler because its oscillation wavelength is little varied in accordance with a change of an injected current.

Although all of the plural pump light sources have a narrow linewidth in this embodiment, the effect to increase the output optical power of the optical fiber amplifier can be attained to some extent when at least one of the plural pump light sources has a narrow linewidth and other light sources have a comparatively wide linewidth. However, it goes without saying that all the pump light sources preferably have a narrow linewidth.

(Embodiment 2)

Figure 7:
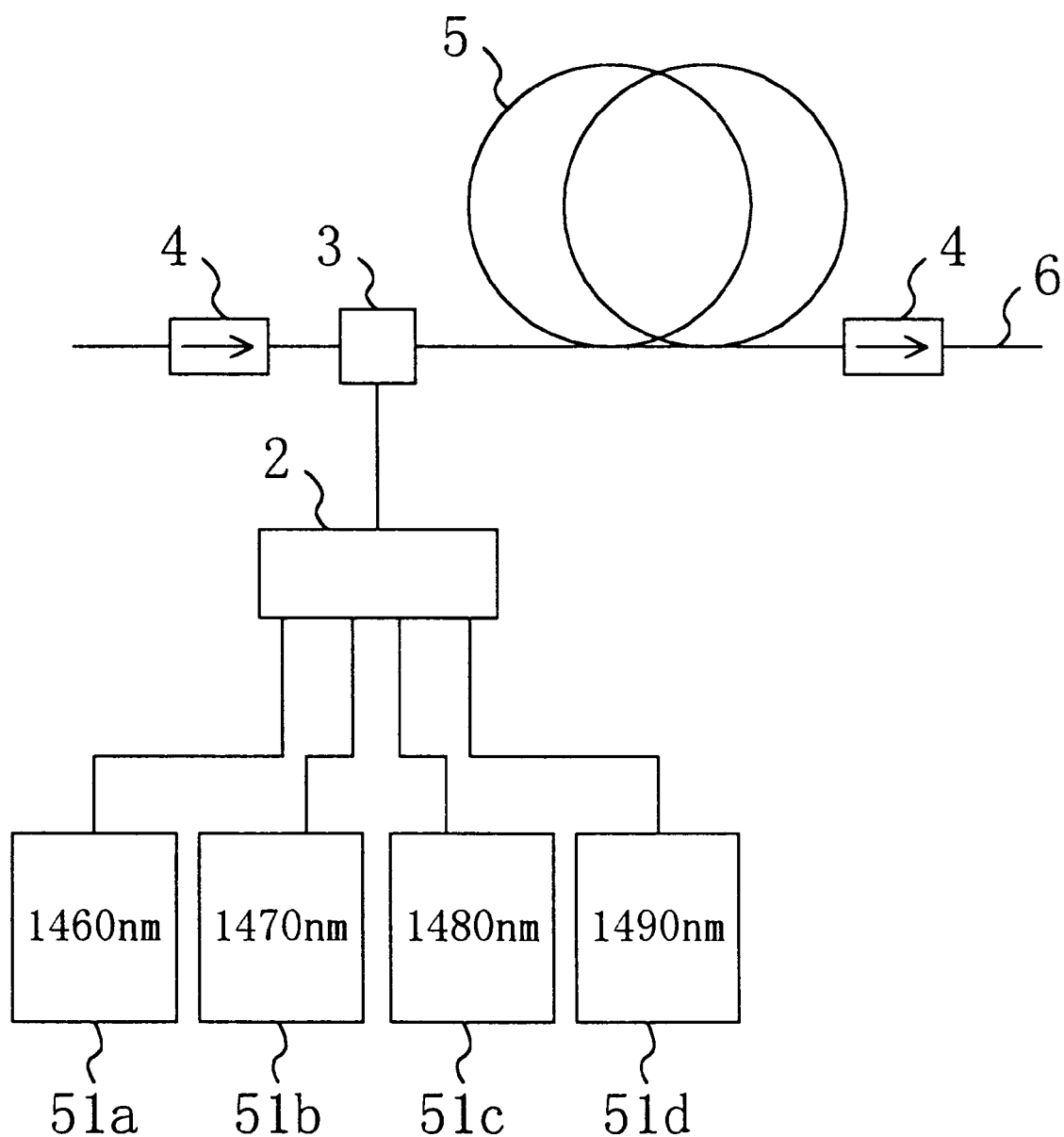
FIG. 7 is a diagram for showing the configuration of an optical fiber amplifier according to a second embodiment.

FIG. 7 shows the configuration of an optical fiber amplifier according to a second embodiment of the invention. This embodiment is different from the first embodiment in using DFB (distributed feedback) lasers as the pump light sources.

Pump light sources 51a, 51b, 51c and 51d are all DFB lasers each having an oscillation linewidth of 100 MHz. The central wavelengths of the pump light sources 51a, 51b, 51c and 51d are 1460 nm, 1470 nm, 1480 nm and 1490 nm, respectively, all of which are included in the pump light absorption wavelength band of an erbium ion, ranging between 1450 nm and 1500 nm. Since the DFB lasers are used as the pump light sources 51a, 51b, 51c and 51d, the linewidth of each pump light can be minimized to approximately 1 nm or less. Accordingly, a large number of pump light can be allocated to the pump light absorption wavelength band of an erbium ion. The transmission wavelength band characteristic of a wavelength multiplex coupler 2 of this embodiment is the same as that shown in FIG. 6, and the central wavelength of each input port of the coupler accords with the central wavelength of the corresponding pump light source. Also, the transmission wavelength bandwidth of each input port of the coupler is 8 nm.

Since all the spectra of the pump light are completely included in the transmission wavelength band, the insertion loss in the output light from the pump light sources can be made smaller than in the first embodiment. The pump light of this embodiment is coupled with an optical fiber with an insertion loss of 0.4 dB.

The wavelength multiplexed pump light is coupled with signal light in the 1.55 µm band by a wavelength multiplex coupler 3, so as to enter an erbium-doped fiber 5. The erbium-doped fiber 5 is pumped by the pump light in the 1.48 µm band, so that the signal light can be amplified to be output from an optical fiber 6. At the both ends of the erbium-doped fiber 5, optical isolators 4 are inserted for the purpose of preventing oscillation of the signal light due to a high gain.

Each of the pump light sources 51a through 51d used in this embodiment has output optical power of 100 mW. The total optical power obtained after coupling the pump light from the four pump light sources by using the wavelength multiplex coupler 2 is 365 mW, with the insertion loss of the wavelength multiplex coupler 2 of 0.4 dB subtracted. The used erbium-doped fiber has a length of 50 m. The output optical power of the signal light obtained when the incident power is 0 dBm is 255 mW, and the conversion efficiency is 70%.

In this manner, since the pump light from the DFB semiconductor lasers are wavelength multiplexed for pumping the erbium-doped fiber in this embodiment, the output optical power of the optical fiber amplifier can be increased.

(Embodiment 3)

In this embodiment, consideration will be given on usage of pump light having central wavelengths equally distributed in a range between 1450 nm and 1500 nm in the 1.48 µm, i.e., the pump light absorption wavelength band of an erbium ion.

In the wavelength multiplex of laser beams emitted by pump light sources, a larger number of the wavelength multiplexing cannot necessarily lead to the increase of a total optical power of the pump light. This is because, when the number of the wavelength multiplex is increased, the number of necessary couplers for the multiplex is also increased, and hence the sum of the insertion losses of the couplers cannot be negligible. The total loss caused by the couplers increases as the number of the couplers increases. Also, in order to obtain pump light having a spectrum according to the absorption wavelength band of a rare earth-doped optical fiber, it is necessary to increase the number of the wavelength multiplex while decreasing a difference in the wavelength between the pump light to be multiplexed. For this purpose, a wavelength multiplex coupler having a narrower band characteristic is required. In a wavelength multiplex coupler using a dielectric multilayer film filter, which can achieve the narrow band characteristic, the insertion loss is increased as the transmission wavelength band is narrower. In considering these facts, it is understood that the increase of the number of the wavelength multiplex cannot necessarily increase the total optical power of the pump light.

Figure 8A:
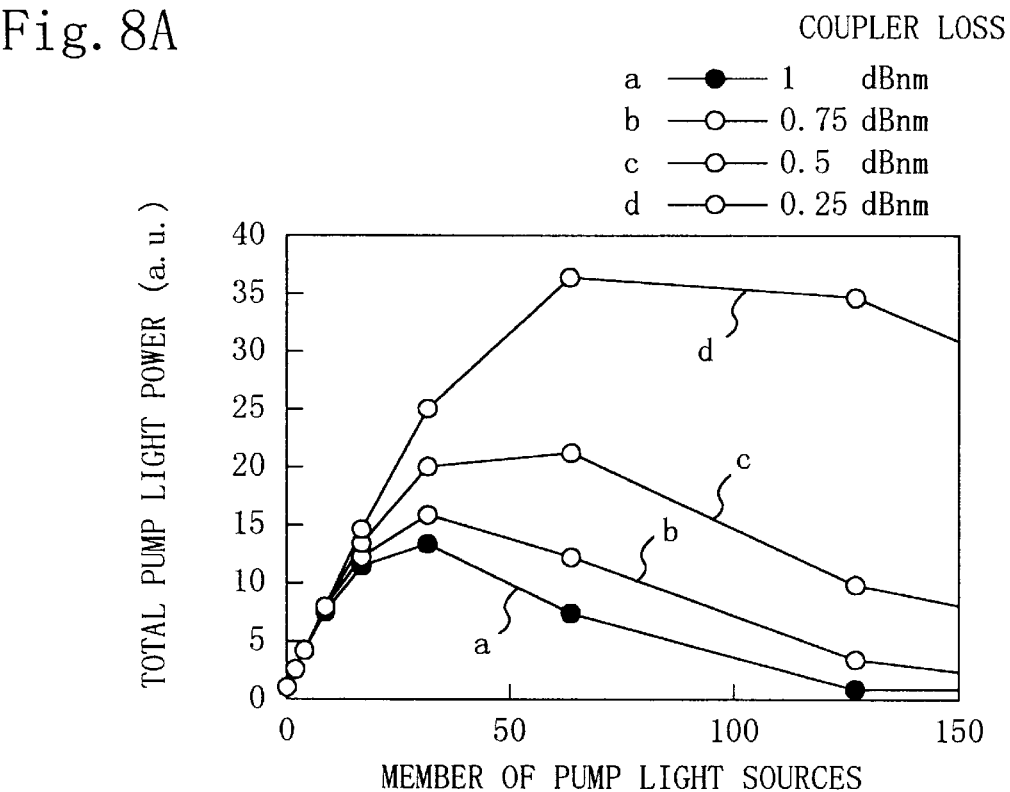
FIG. 8A is a graph for showing a characteristic of total optical power of the pump light against a number of wavelength multiplex.

In a presently available coupler, when the transmission wavelength band is approximately 10 nm, the insertion loss is 0.1 dB or more, and as the transmission wavelength band is narrower, the insertion loss is larger. When the transmission band is 0.5 nm, the insertion loss is approximately 2 dB. When the transmission wavelength band is in such a range, the product of the transmission band and the insertion loss can be obtained as a constant value of 1 dB·nm. When this product is used as a parameter for obtaining the total optical power of the pump light against the number of the wavelength multiplex, the result is obtained as is shown in FIG. 8A. As is shown with a line a in FIG. 8A, when the product is 1 dB·nm, the total optical power of the pump light can be maximized by setting the number of wavelength multiplex at approximately 40. When a coupler having a comparatively small loss (for example, when the product is 0.25 dB·nm), the total optical power of the pump light is increased in accordance with the increase of the number of the wavelength multiplex until the number of the wavelength multiplex is approximately 130, as is shown with a line d of FIG. 8A.

Figure 8B:
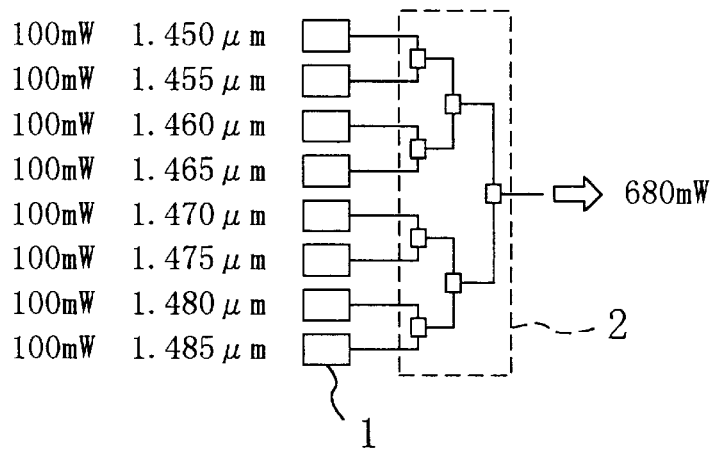
FIG. 8B shows the configuration of a wavelength multiplex coupler.
Figure 9:
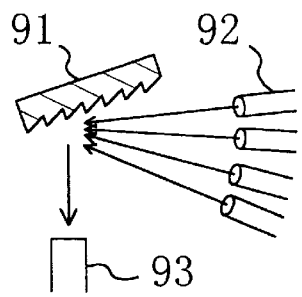
FIG. 9 illustrates another coupler adoptable in the invention.

It is noted that the result shown in FIG. 8A is obtained under assumption that a wavelength multiplex coupler has a configuration where two-branched couplers are connected with one another at plural stages (as is shown in FIG. 8B) as the presently used coupler. However, when a coupler as is shown in FIG. 9, where the entire wavelength range is branched at an equal interval, is used, a similar result can be obtained. In the coupler of FIG. 9, pump light having different wavelengths from plural optical fibers 92 are multiplexed by using a grating 91, and the thus obtained multiplexed light is coupled with an optical fiber 93 for output.

In this manner, when a narrow-linewidth light sources are used, the insertion loss of couplers does not cause a serious problem even if the number of wavelength multiplex is increased up to, for example, approximately 40. Also, there is a preferable range in the number of the wavelength multiplex, and the preferable range is found to be between approximately 30 and approximately 150.

Figure 10:
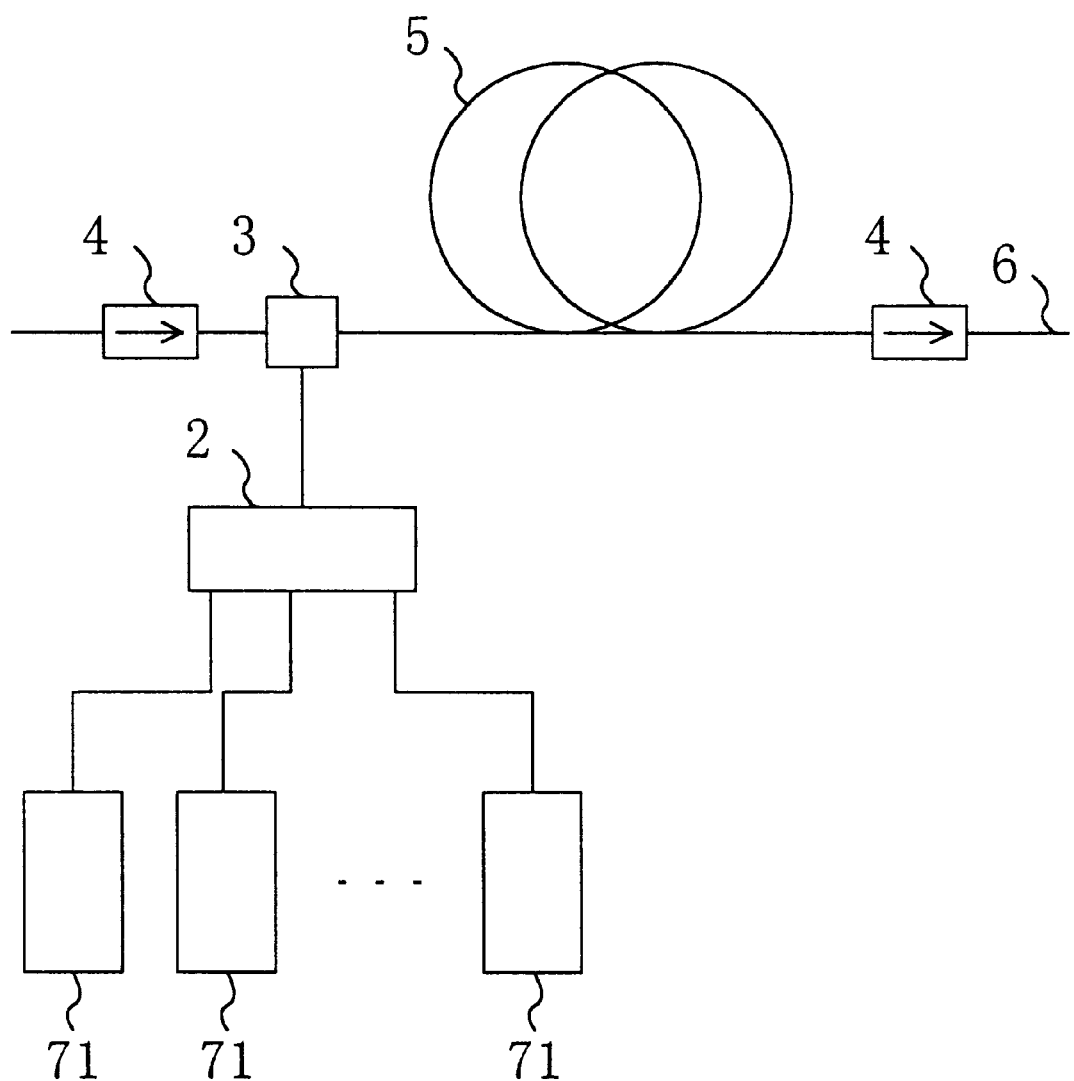
FIG. 10 is a diagram for showing the configuration of an optical fiber amplifier according to a third embodiment.

Now, an optical fiber amplifier according to the third embodiment will be described with reference to FIG. 10.

Pump light sources 71 of this optical fiber amplifier include thirty-two semiconductor lasers, each of which is a DFB laser having an oscillation linewidth of 100 MHz. The central wavelengths of the respective semiconductor lasers are distributed at an equal interval in the range between 1450 nm and 1500 nm. The central wavelength of each input port of a wavelength multiplex coupler 2 accords with the central wavelength of the corresponding pump light source.

Since the number of couplers is increased when the number of the wavelength multiplex is increased, the loss caused by the couplers in the resultant pump light is also increased. The pump light in this embodiment is coupled with an optical fiber with an insertion loss of 1.25 dB. The coupled pump light is coupled with signal light in the 1.55 μm band by a wavelength multiplex coupler 3, so as to enter an erbium-doped fiber 5. The erbium-doped fiber 5 is pumped by the pump light in the 1.48 μm band, so that the signal light can be amplified to be output from an optical fiber 6. At the both ends of the erbium-doped fiber, optical isolators 4 are inserted for the purpose of preventing oscillation of the signal light due to a high gain.

The output power of each pump light source 71 is 100 mW. The total optical power of the pump light obtained by coupling the light emitted by the thirty-two semiconductor lasers by using the wavelength multiplex coupler 2 is 2.4 W, with the insertion loss of 1.25 dB subtracted. The length of the used erbium-doped fiber is 150 m. The output optical power of the signal light obtained when the incident power is 0 dBm is 1.7 W, and the conversion efficiency is approximately 70%.

In this manner, since the number of the wavelength multiplex of the DFB pump light sources is optimized for pumping the erbium-doped fiber, large output optical power can be attained in this embodiment.

Although the DFB semiconductor lasers are used in this embodiment, Fabry-Perot lasers with a narrow linewidth can achieve the same effect as far as they have a sufficiently narrow oscillation linewidth.

(Embodiment 4)

Figure 11:
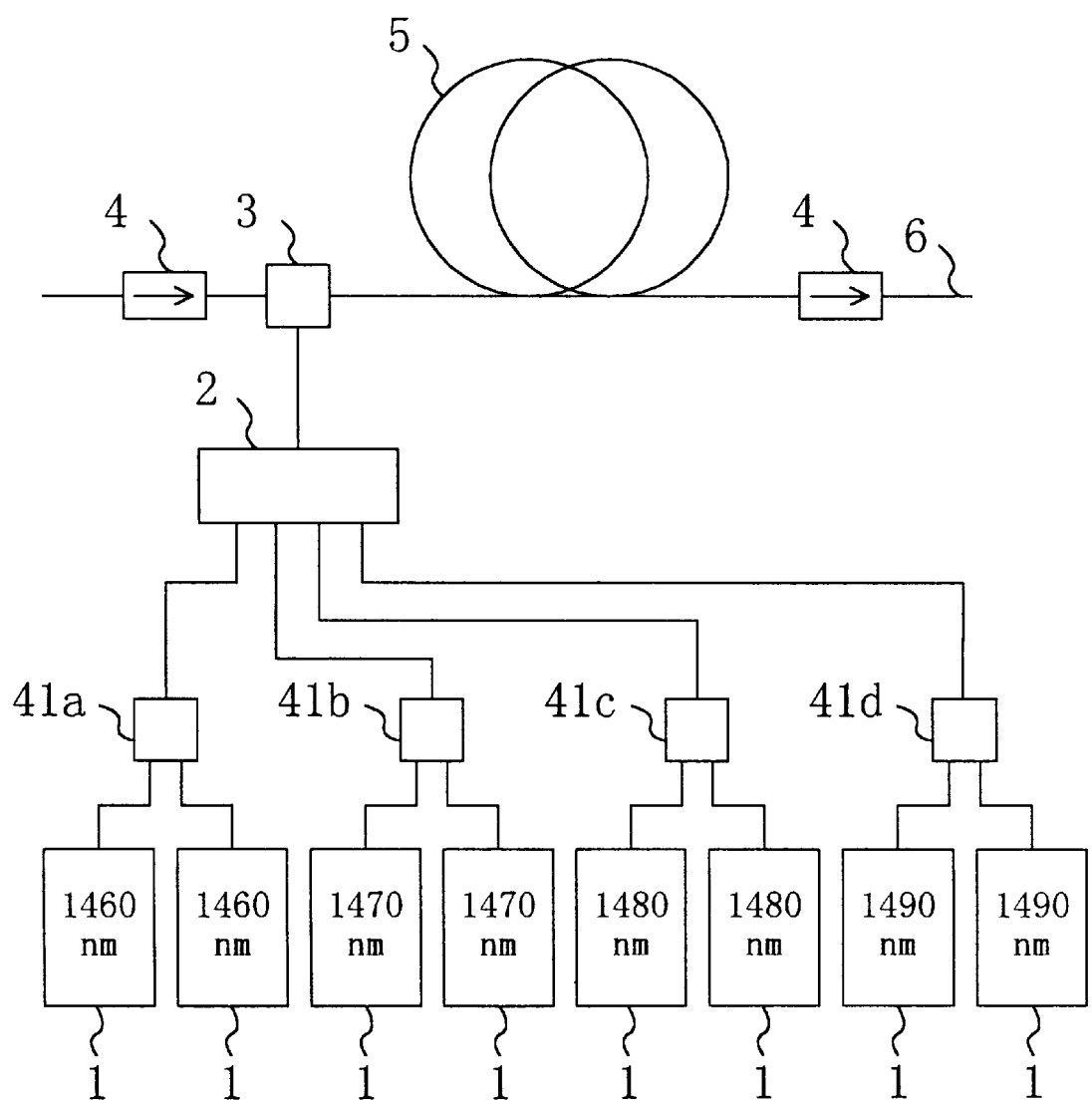
FIG. 11 is a diagram for showing the configuration of an optical fiber amplifier according to a fourth embodiment.

FIG. 11 shows the configuration of an optical fiber amplifier according to a fourth embodiment of the invention. Each of eight pump light sources 1 is a Fabry-Perot laser having a linewidth of 5 nm or less.

The central wavelengths of the respective lasers are 1460 nm, 1470 nm, 1480 nm and 1490 nm. Two of the pump light sources have the same central wavelength, and pump light having the same central wavelength are polarization-coupled. The laser beams having the same wavelength are first coupled by polarization couplers 41a, 41b, 41c and 41c. Each of the polarization couplers 41a through 41d is used for coupling laser beams having the same wavelength but different polarization by 90 degrees, such as a TE mode and a TM mode. When the laser beams having different polarization by 90 degrees are coupled, the laser beams do not interfere with each other, resulting in causing a small loss.

A wavelength multiplex coupler 2 has the transmission wavelength characteristic as is shown in FIG. 6. The central wavelength of each input port of the coupler accords with the central wavelength of the corresponding pump light source, and the transmission wavelength bandwidth is 8 nm. Thus, the output light from all the pump light sources is coupled with an optical fiber with an insertion loss of 0.5 dB. The coupled pump light is coupled with signal light in the 1.55 μm band by a wavelength multiplex coupler 3, so as to enter an erbium-doped fiber 5. The erbium-doped fiber 5 is pumped by the pump light in the 1.48 μm band, so that the signal light can be amplified to be output from an optical fiber 6. At the both ends of the erbium-doped fiber, optical isolators 4 are inserted for the purpose of preventing oscillation of the signal light due to a high gain.

Each of the pump light sources 1 of this embodiment has output optical power of 100 mW, and the total optical power of the eight pump light sources coupled by using the polarization coupler and the wavelength coupler is 710 mW, with the insertion loss of 0.5 dB subtracted. The length of the used erbium-doped fiber is 50 m. The output optical power of the signal light obtained when the incident power is 0 dBm is 500 mW, and the conversion efficiency is 70%.

In this manner, the light from the narrow-linewidth pump light sources are subjected to both the polarization multiplex and the wavelength multiplex for pumping the erbium-doped fiber, and hence, the signal light with large output optical power as described above can be obtained in this embodiment.

Although the Fabry-Perot lasers are used as the narrow-linewidth pump light sources in this embodiment, the same effect can be achieved by using DFB semiconductor lasers, super luminescent light sources, surface emitting lasers, external resonator type lasers using fiber grating as far as they have large output optical power and a narrow linewidth. In particular, the external resonator type laser using fiber grating can exhibit an effect that the central wavelength of the pump light is hardly shifted from each central wavelength of the wavelength multiplex coupler because its oscillation wavelength is little varied in accordance with a change of an injected current.

(Embodiment 5)

Figure 12:
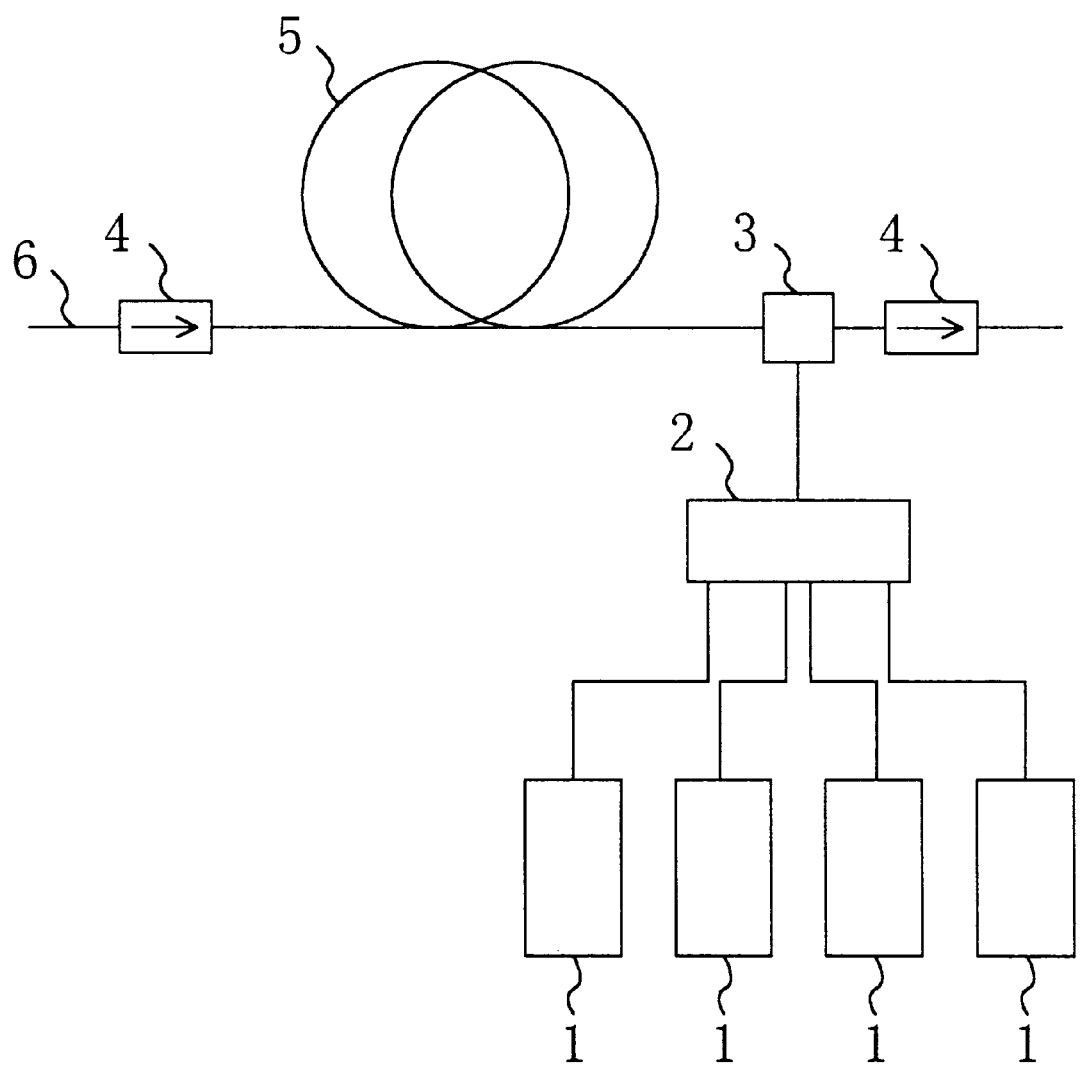
FIG. 12 is a diagram for showing the configuration of an optical fiber amplifier according to a fifth embodiment.

FIG. 12 shows the configuration of an optical fiber amplifier according to a fifth embodiment of the invention. This embodiment is different from the first embodiment in adopting a back pumping system where pump light sources are disposed at the back of (i.e., at the output side of) an erbium-doped fiber 5.

Each of plural pump light sources 1 is a Fabry-Perot laser with a linewidth of 5 nm or less. The central wavelengths of the respective lasers are 1460 nm, 1470 nm, 1480 nm and 1490 nm, all of which are included in the pump light absorption band of an erbium ion ranging between 1450 nm and 1500 nm. A wavelength multiplex coupler 2 has the transmission wavelength characteristic as is shown in FIG. 6. The central wavelength of each input port of the coupler accords with the central wavelength of the corresponding pump light source, and the transmission wavelength bandwidth is 8 nm. Thus, the output light from all the pump light sources is coupled with an optical fiber with an insertion loss of 0.5 dB. The coupled pump light is coupled with signal light in the 1.55 µm band by a wavelength multiplex coupler 3, so as to enter the erbium-doped fiber 5. The erbium-doped fiber 5 is pumped by the pump light in the 1.48 µm band, so that the signal light can be amplified to be output from an optical fiber 6. At the both ends of the erbium-doped fiber, optical isolators 4 are inserted for the purpose of preventing oscillation of the signal light due to a high gain.

Each of the pump light sources 1 of this embodiment has output optical power of 100 mW, and the optical power obtained by coupling four pump light by using the wavelength coupler is 360 mW, with the insertion loss of 0.5 dB subtracted. The length of the used erbium-doped fiber is 50 m. The output optical power of the signal light obtained when the incident power is 0 dBm is 270 mW, and the conversion efficiency is 75%.

In this manner, when the optical fiber amplifier adopts the back pumping system, the conversion efficiency can be improved, resulting in attaining larger output optical power. Furthermore, since the light from the narrow-linewidth pump light sources are wavelength multiplexed for pumping the erbium-doped fiber in this embodiment, the resultant optical fiber amplifier can attain large output optical power.

Although the narrow-linewidth pump light sources are used in describing the optical fiber amplifier of the back pumping system, DFB semiconductor lasers can be used as in the second embodiment. In addition, the resultant optical fiber amplifier can attain further larger output power by optimizing the number of the pump light sources as in the third embodiment or by adopting the polarization coupling together as in the fourth embodiment. Also, the Fabry-Perot lasers are used as the narrow-linewidth pump light sources in this embodiment, but the same effect can be attained by using super luminescent light sources, surface emitting lasers or external resonator type lasers using fiber grating as far as they have large power and a narrow linewidth. In particular, the external resonator type laser using fiber grating can exhibit an effect that the central wavelength of the pump light is hardly shifted from each central wavelength of the wavelength multiplex coupler because its oscillation wavelength is little varied in accordance with a change of an injected current.

(Embodiment 6)

Figure 13:
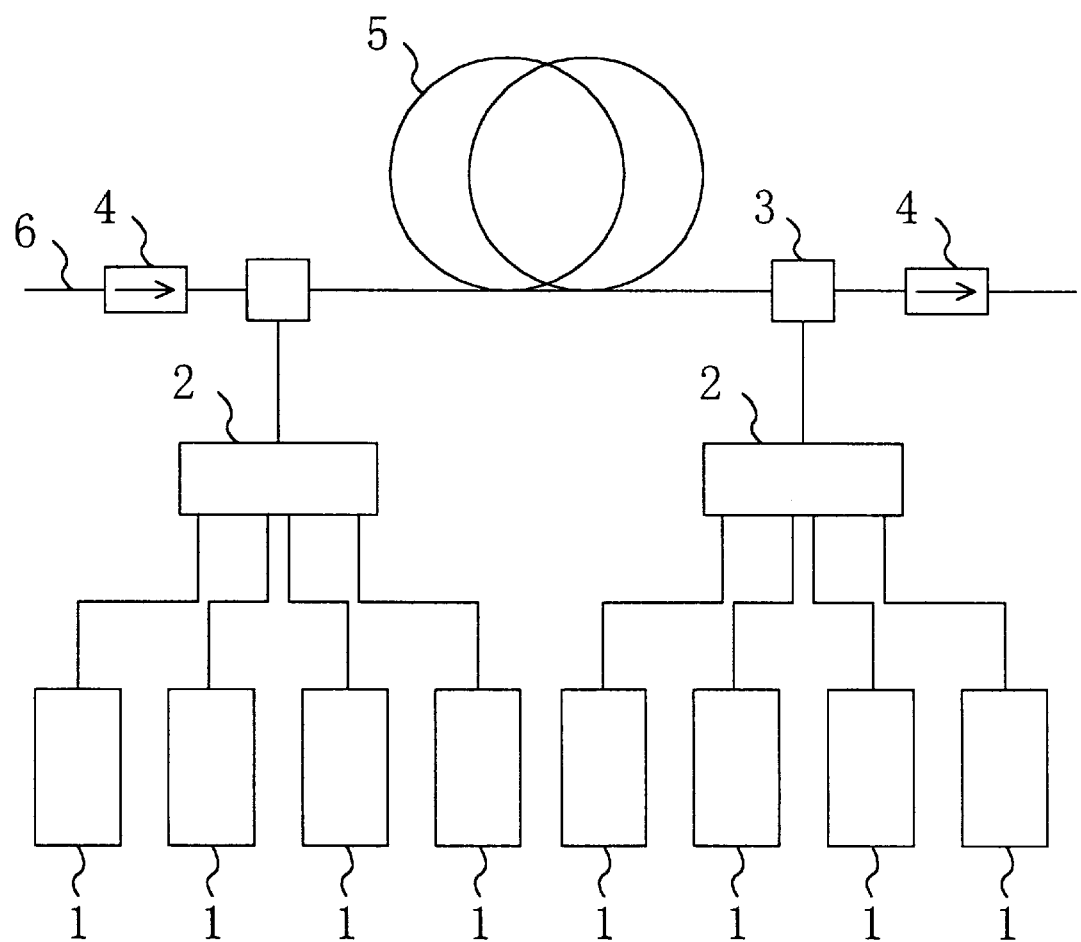
FIG. 13 is a diagram for showing the configuration of an optical fiber amplifier according to a sixth embodiment.

FIG. 13 shows the configuration of an optical fiber amplifier according to a sixth embodiment of the invention. In this embodiment, description will be given on a bidirectional pumping system where a front pumping system of FIG. 1 and the back pumping system of FIG. 12 are combined.

Each of plural pump light sources 1 is a Fabry-Perot laser with a linewidth of 5 nm or less. The central wavelengths of the respective lasers are 1460 nm, 1470 nm, 1480 nm and 1490 nm, all of which are included in the pump light absorption wavelength band of an erbium ion ranging between 1450 nm and 1500 nm. A wavelength multiplex coupler 2 has the transmission wavelength characteristic as is shown in FIG. 6. The central wavelength of each input port of the coupler accords with the central wavelength of the corresponding pump light source, and the transmission wavelength bandwidth is 8 nm. Thus, the output light from all the pump light sources is coupled with an optical fiber with an insertion loss of 0.5 dB. The coupled pump light is coupled with signal light in the 1.55 µm band by a wavelength multiplex coupler 3, so as to enter an erbium-doped fiber 5. The erbium-doped fiber 5 is pumped by the pump light in the 1.48 µm band, so that the signal light can be amplified to be output from an optical fiber 6. At the both ends of the erbium-doped fiber, optical isolators 4 are inserted for the purpose of preventing oscillation of the signal light due to a high gain.

The output optical power of each pump light source 1 of this embodiment is 100 mW, and the optical power obtained by multiplexing the pump light from the four light sources by using each wavelength multiplex coupler 2 is 360 mW, with the insertion loss of 0.5 dB subtracted, and the total optical power of the pump light obtained by allowing the pump light to bidirectionally enter the erbium-doped fiber is 720 mW. The length of the used erbium-doped fiber is 50 m. The output optical power of the signal light obtained when the incident power is 0 dBm is 525 mW, and the conversion efficiency is 73%.

In this manner, by adopting the bidirectional pumping system in the optical fiber amplifier, the number of the pump light sources can be increased, resulting in obtaining larger output optical power. In addition, since the light from the narrow-linewidth pump light sources are wavelength multiplexed for pumping the erbium-doped fiber in this embodiment, the resultant optical fiber amplifier can attain large output optical power.

Although the narrow-linewidth pump light sources are used in describing the optical fiber amplifier of the bidirectional pumping system, DFB semiconductor lasers can be used as in the second embodiment. In addition, the resultant optical fiber amplifier can attain further larger output power by optimizing the number of the pump light sources as in the third embodiment or by adopting the polarization coupling together as in the fourth embodiment. Also, the Fabry-Perot lasers are used as the narrow-linewidth pump light sources in this embodiment, but the same effect can be attained by using super luminescent light sources, surface emitting lasers or external resonator type lasers using fiber grating as far as they have large optical power and a narrow linewidth. In particular, the external resonator type laser using fiber grating can exhibit an effect that the central wavelength of the pump light is hardly shifted from each central wavelength of the wavelength multiplex coupler because its oscillation wavelength is little varied in accordance with a change of an injected current.

(Embodiment 7)

A wavelength multiplexed pump light source module according to a seventh embodiment of the invention will now be described with reference to FIGS. 14A through 14C.

Figure 14A:
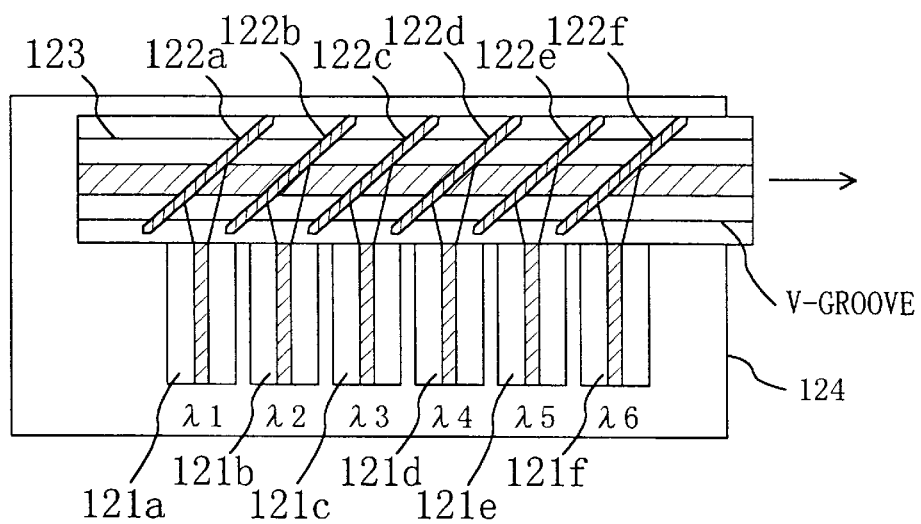
FIG. 14A is a plan view of a pump light source module according to a seventh embodiment.
Figure 14B:
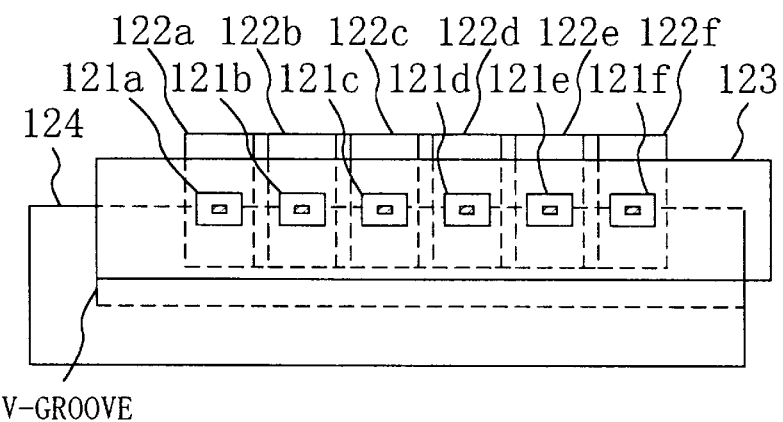
FIG. 14B is a sectional view of the pump light source module taken on an optical axis of a fiber.
Figure 14C:
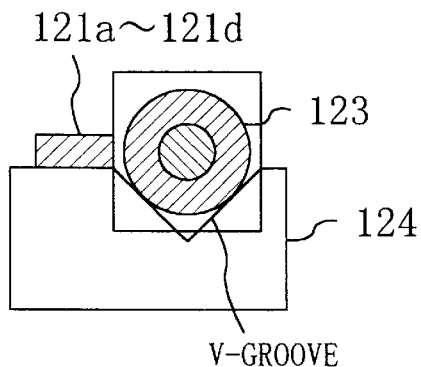
FIG. 14C is a sectional view of the pump light source module taken on a plane perpendicular to the optical axis of the fiber.

FIG. 14A is a plan view of the pump light source module of this embodiment, FIG. 14B is a sectional view thereof taken along the optical axis of a fiber, and FIG. 14C is a sectional view thereof taken along a plane perpendicular to the optical axis of the fiber.

As is shown in FIG. 14A, the pump light source module of this embodiment includes plural semiconductor lasers 121a through 121f disposed on a silicon substrate 124, so that a laser beam from each of the semiconductor lasers 121a through 121f can be coupled with one optical fiber 123. From one end of the optical fiber 123, wavelength multiplexed pump light is emitted. Each of the semiconductor lasers 121a through 121f is a Fabry-Perot laser with a linewidth of 5 nm or less.

On the surface of the silicon substrate 123, a V-shaped groove is formed by etching, so that the optical fiber 123 can be disposed in the V-shaped groove. The optical fiber 123 is supported by the two inclined faces of the V-shaped groove. In an area on the surface of the silicon substrate 123 where the V-shaped groove is not formed, the semiconductor lasers 121a through 121f are disposed so that each laser beam can vertically enter the fiber 123. These semiconductor lasers are aligned along the edge of the V-shaped groove.

The optical fiber 123 has plural grooves (each with a width of 50 $\mu$m) parallel to one another and inclined to the optical axis, and narrow band-pass filters 122a through 122f are fit in the respective grooves. Each of the filters 122a through 122f has a size slightly larger than a slant section of the fiber 123, and is fixed with a resin having a refractive index substantially equal to that of the fiber 123. The resin having the refractive index substantially equal to that of the fiber 123 is used because presence of a resin with a different refractive index on an optical path causes a loss of light.

The filters 122a through 122f are necessary for introducing the laser beams from the semiconductor lasers 121a through 121f into the optical fiber 123. The semiconductor lasers 121a through 121f are disposed so that the laser beams can enter the center of the optical fiber 123. Specifically, as is shown in FIG. 14C, the positional relationship between the semiconductor lasers 121a through 121f and the optical fiber 123 is adjusted so that the center of the optical fiber 123 fixed on the inclined faces of the V-shaped groove can substantially accord with the active layers of the semiconductor lasers 121a through 121f.

The light emitted from the semiconductor lasers 121a through 121f are reflected by the corresponding filters 122a through 122f, so as to be coupled with the optical fiber 123. When a plurality of filters having different transmission wavelength bands are used, the output light from semiconductor lasers for pumping having different central wavelengths can be coupled with the single optical fiber 123.

This pump light source module includes the six narrow-linewidth Fabry-Perot lasers 121a through 121f. The central wavelengths of the respective lasers are 1450 $\mu$m, 1460 nm, 1470 nm, 1480 nm, 1490 nm and 1500 nm. These wavelengths are all included in the pump light absorption wavelength band of an erbium ion ranging between 1450 nm and 1500 nm.

Figure 15:
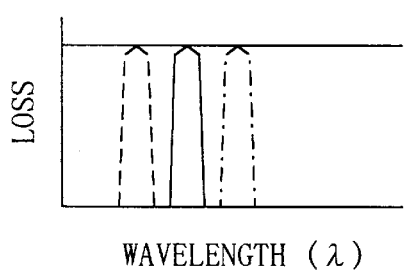
FIG. 15 shows a transmission wavelength band characteristic of a filter used in the seventh embodiment.

FIG. 15 shows the transmission wavelength band characteristic of the narrow band-pass filters 122a through 122f. The central wavelength of each of the filters accords with the central wavelength of the corresponding pump light source, and the reflection wavelength bandwidth is 8 nm. Thus, the output light from all the pump light sources is coupled with the optical fiber with an insertion loss of 0.5 dB.

In a conventional configuration where multi-stage filters are used, the number of the input ports is required to be a multiplier of 2, and hence, the number of the pump light sources is required to be increased rapidly to, for example, sixteen, thirty-two, sixty-four, etc. or alternatively, some of the input ports are wastefully not used and hence a large coupler loss is caused. However, according to this embodiment, the difference in the wavelength between the pump light can be optimized and the coupler loss can be minimized even when five or six, or forty or fifty pump light sources are coupled.

Although the Fabry-Perot lasers are used as the narrow-linewidth pump light sources in this embodiment, DFB semiconductor lasers, super luminescent light sources or surface emitting lasers can be used as far as they have large optical power and a narrow linewidth.

(Embodiment 8)

Figure 16:
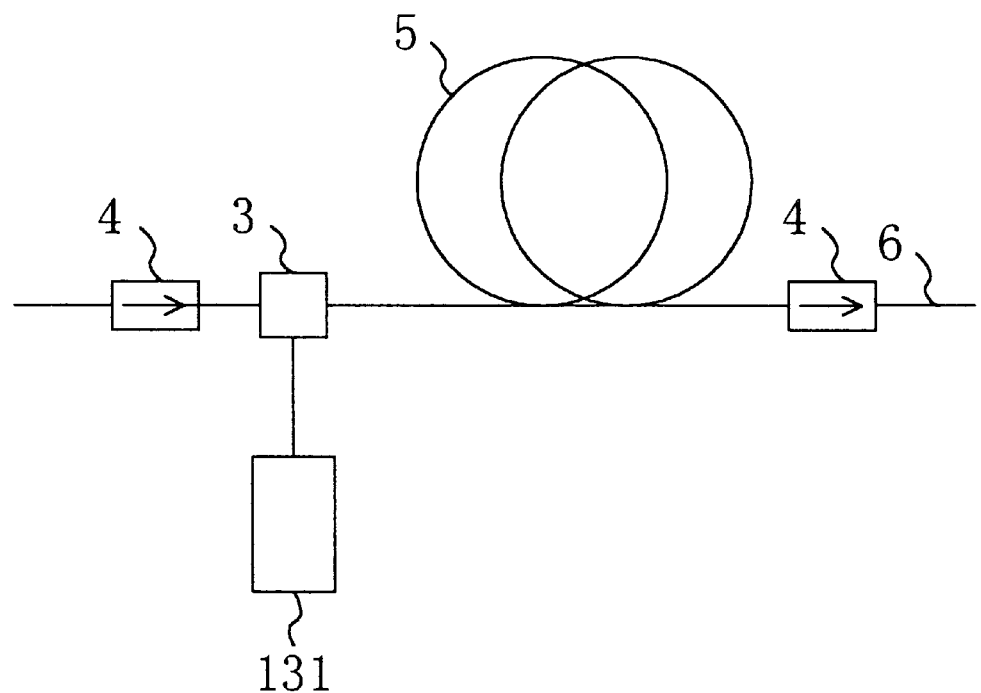
FIG. 16 is a diagram for showing the configuration of an optical fiber amplifier according to an eighth embodiment.

FIG. 16 shows the configuration of an optical fiber amplifier according to an eighth embodiment of the invention. As a pump light source 131, the pump light source module of the seventh embodiment is used. Coupled pump light is coupled with signal light in the 1.55 $\mu$m band by a wavelength multiplex coupler 3, so as to enter an erbium-doped fiber 5. The erbium-doped fiber 5 is pumped by the pump light in the 1.48 $\mu$m band, so that the signal light can be amplified to be output from an optical fiber 6. At the both ends of the erbium-doped fiber, optical isolators 4 are interposed for the purpose of preventing oscillation of the signal light due to a high gain.

The output optical power of the pump light source module used in this embodiment is 360 mW. The length of the erbium-doped fiber is 50 m. The output optical power of the signal light obtained when the incident power is 0 dBm is 250 mW, and the conversion efficiency is 70%.

In this manner, since the pump light source module for generating pump light by wavelength multiplexing narrow-linewidth light is used in this embodiment, the optical fiber amplifier having large output optical power can be realized with a simple configuration.

Although the front pumping system is used in this embodiment, a larger output power characteristic can be realized by adopting the back pumping system. Furthermore, when the bidirectional pumping system is adopted, the number of the pump light source modules can be doubled, resulting in realizing an optical fiber amplifier with further larger output optical power.

(Embodiment 9)

Figure 17:
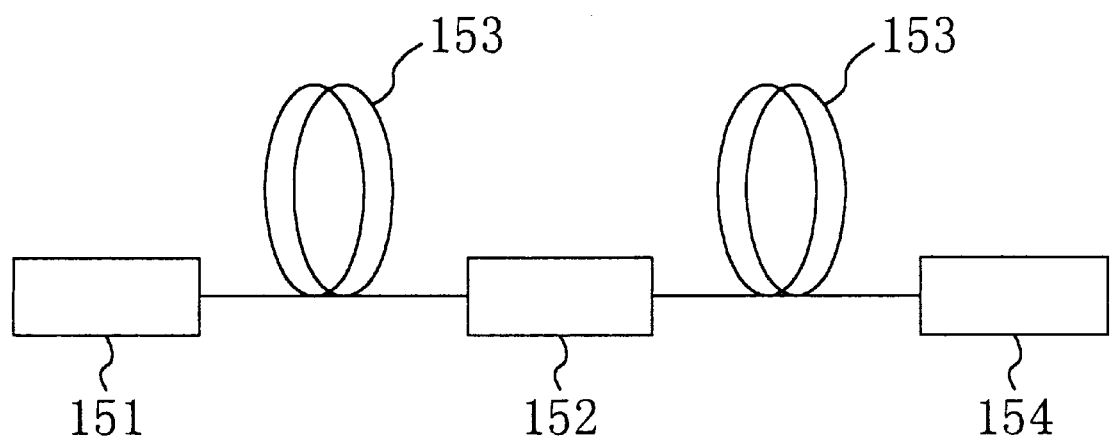
FIG. 17 is a diagram for showing the configuration of an optical fiber communication system according to a ninth embodiment.
Figure 18A:
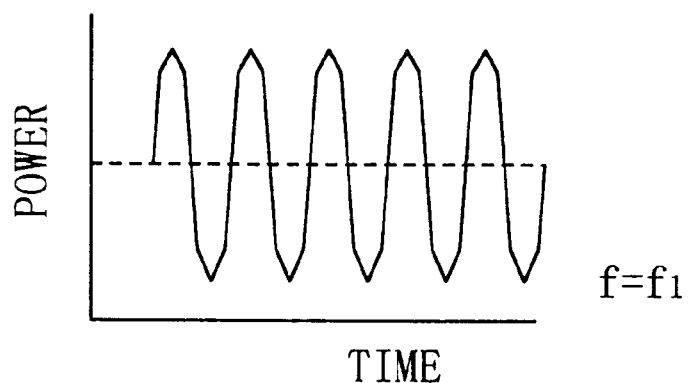
FIG. 18A shows a change with time of optical power of a first pump light source.
Figure 18B:
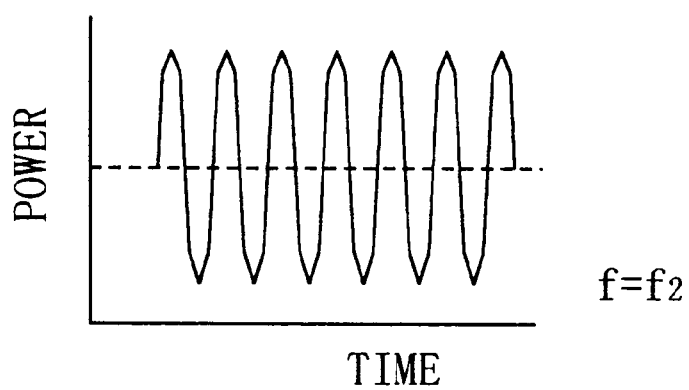
FIG. 18B shows a change with time of optical power of a second pump light source.
Figure 18C:
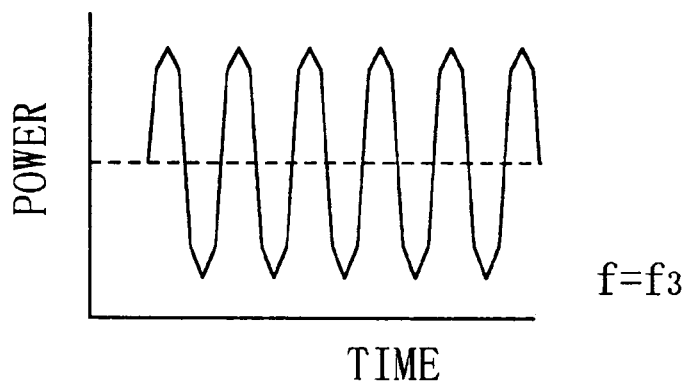
FIG. 18C shows a change with time of optical power of a third pump light source.
Figure 18D:
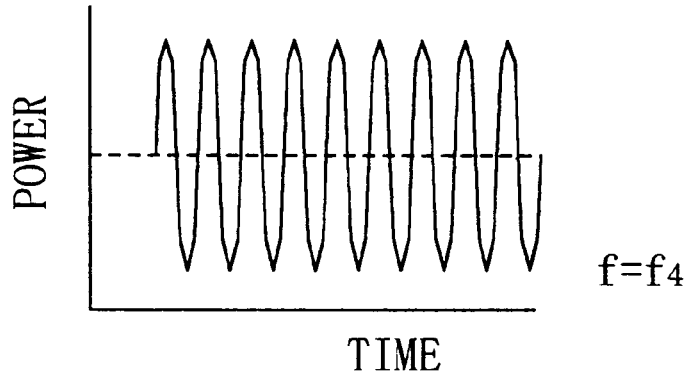
FIG. 18D shows a change with time of optical power of a fourth pump light source.
Figure 19:
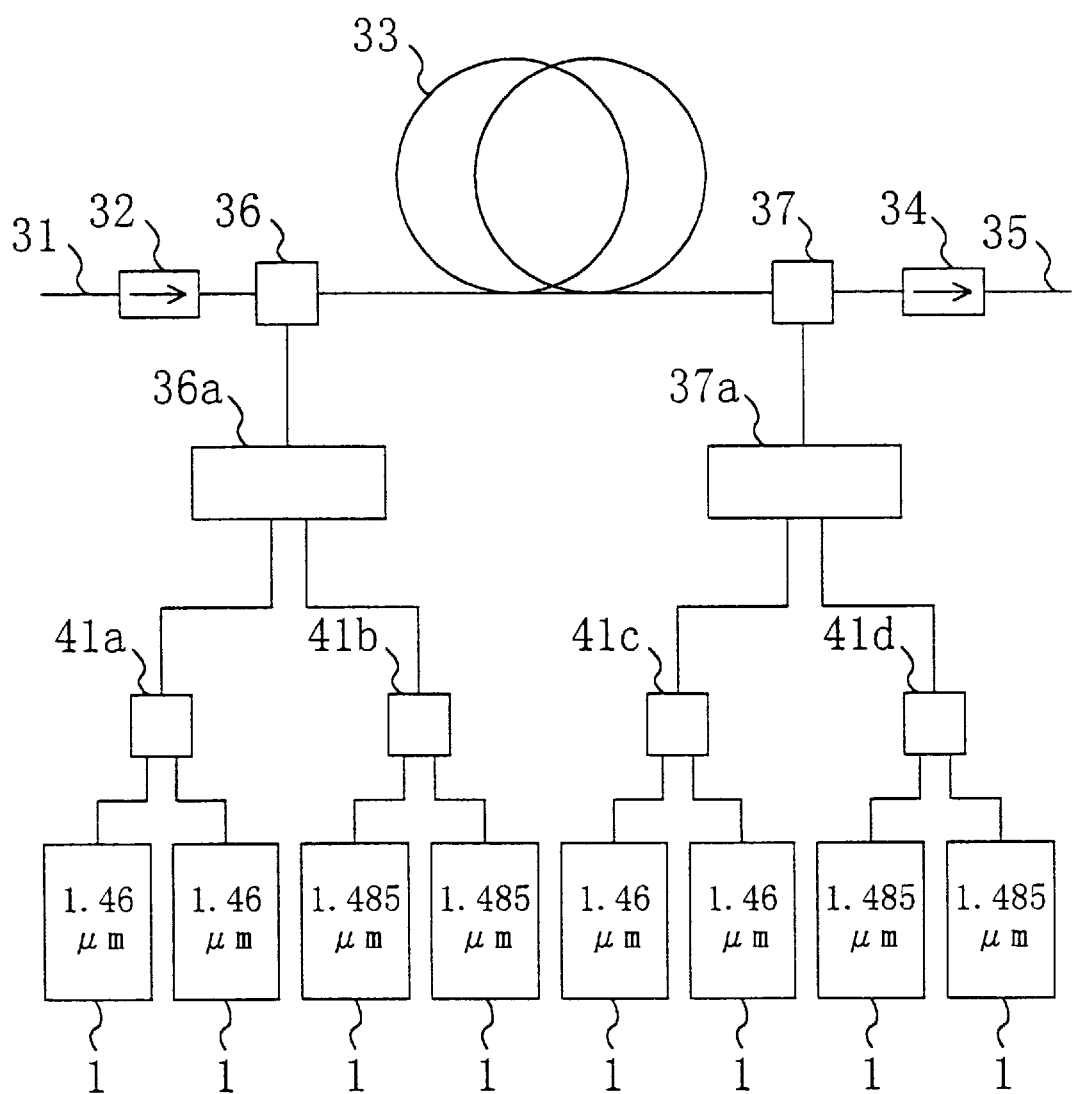
FIG. 19 is a diagram for showing the configuration of a conventional optical fiber amplifier.
Figure 20:
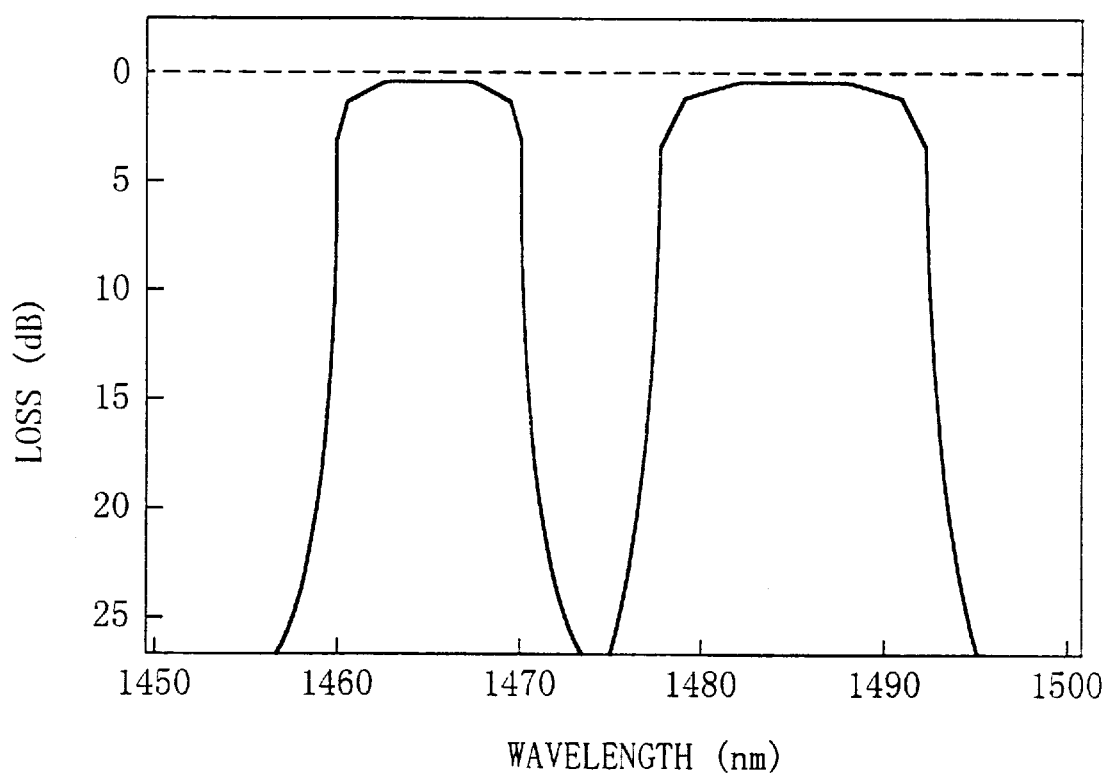
FIG. 20 shows a transmission wavelength band characteristic of a wavelength multiplex coupler used in the conventional optical fiber amplifier and a spectrum of pump light multiplexed by the coupler.

FIG. 17 shows the configuration of an optical fiber communication system according to a ninth embodiment of the invention.

A DFB laser 151 serving as a signal light source is directly modulated in accordance with an AM-FDM signal, so as to output signal light in the 1.55 $\mu$m band. An optical fiber 153 serving as a transfer path is formed by connecting two fibers each having a length of 40 km, and an optical fiber amplifier 152 is interposed between the two fibers so as to directly amplify an optical signal. The optical fiber amplifier 152 is one described in the eighth embodiment and can exhibit a large output optical power characteristic. The amplified optical signal is further transferred through the optical fiber, and is converted into an electric signal by an optical signal receiver 154.

(Embodiment 10)

In any of the aforementioned embodiments, a drive current for the pump light sources is not particularly modulated. Attenuation of narrow-linewidth pump light is easily caused by a Brillouin scattering loss in an optical fiber as described above. Such a loss of the pump light does not cause any significant problem in the case where the optical fiber has a length of approximately 100 m or less, but when the length exceeds approximately 100 m, the loss cannot be negligible.

In this embodiment, a pump light source is high-frequency modulated, thereby decreasing a loss caused by Brillouin scattering.

FIGS. 18A through 18D show a change with time of optical power resulting from high-frequency modulation of a drive current (injection current) supplied to four pump light sources with frequencies f1, f2, f3 and f4, respectively. Each of the modulation frequencies f1 through f4 has a value approximate to 600 MHz. Therefore, the spread of the linewidth due to chirping is several GHz at most. Such spread of the pump light linewidth does not affect the wavelength multiplex but makes a large contribution to the decrease of the loss caused by Brillouin scattering.

Furthermore, the modulation frequencies f1 through f4 for the four pump light sources are preferably different from one another. This is for the purpose of preventing the wavelength multiplexed pump light from having an excessive intensity at a burst.

In this embodiment, the amplitude of an average bias current (shown with dot lines in FIGS. 18A through 18D) is controlled by an automatic power control (APC) circuit, so that the output power level of the optical fiber amplifier can be retained within a predetermined range. This is because the pumped state of rare earth ions within an optical fiber can be sufficiently controlled by a change of the average bias current since the relaxation time of the rare earth ions doped in the optical fiber is approximately 10 msec. Also, the pumped state of the rare earth ions in the optical fiber never changes in accordance with a high frequency component of the pump light. Therefore, the amplification of signal light cannot be affected by the high-frequency modulation.

In this manner, the high frequency modulation of the pump light sources leads to a very desirable effect when narrow-linewidth pump light is used.

In any of the aforementioned embodiments, the 1.48 $\mu$m band (ranging between 1450 nm through 1500 nm) is adopted as the pump light absorption wavelength band of the erbium-doped fiber, but another pump light absorption wavelength band, such as the 0.98 $\mu$m band, can be adopted. In addition, the erbium-doped fiber can be replaced with an optical fiber doped with another rare earth ion, such as a praseodymium (Pr)-doped fiber and a neodymium (Nd)-doped fiber. An optical fiber doped with such rare earth ions is used for amplifying signal light in the 1.3 $\mu$m band.

As described above, light emitted by a narrow-linewidth light source is used for multiplexing pump light in this invention, so that another pump light can be efficiently allocated to a limited absorption wavelength band of a rare earth-doped fiber, thereby increasing total optical power of the pump light. As a result, an input optical signal can be largely amplified, so as to obtain an optical signal with larger output optical power.

What is claimed is:

1. An optical fiber amplifier comprising:

plural pump light sources for emitting pump light;

a first wavelength multiplexer for receiving said pump light emitted by said pump light sources at plural input ports and for wavelength multiplexing said received pump light, so as to generate wavelength multiplexed pump light and output said wavelength multiplexed pump light from an output port;

a second wavelength multiplexer for receiving said wavelength multiplexed pump light at a first input port and receiving signal light at a second input port, so as to generate coupled light by coupling said wavelength multiplexed pump light and said signal light and emit said coupled light from an output port; and a rare earth-doped optical fiber for receiving said coupled light emitted from said output port of said second wavelength multiplexer and amplifying said coupled light, wherein at least one of said pump light sources is a narrow-linewidth light source for emitting light with a laser linewidth of approximately 5 nm or less as said pump light.

2. The optical fiber amplifier of claim 1, wherein said pump light sources include four or more narrow-linewidth light sources having different oscillation wavelengths.

3. The optical fiber amplifier of claim 2, wherein a current injected into each of said four or more narrow-linewidth light sources is modulated.

4. The optical fiber amplifier of claim 1, wherein said narrow-linewidth light source includes a distributed feedback semiconductor laser.

5. The optical fiber amplifier of claim 1, wherein said rare earth-doped fiber is an erbium-doped fiber, and said narrow-linewidth light source includes four semiconductor lasers for respectively emitting light with central wavelengths of approximately 1460 nm, approximately 1470 nm, approximately 1480 nm and approximately 1490 nm.

6. The optical fiber amplifier of claim 1, wherein said pump light sources include said narrow-linewidth light source in a number ranging between approximately 30 and approximately 150.

7. The optical fiber amplifier of claim 1, further comprising a polarization coupler for polarization coupling said pump light emitted by said pump light sources.

8. An optical fiber amplifier comprising:

a plurality of first pump light sources for emitting first pump light;

a plurality of second pump light sources for emitting second pump light;

a first wavelength multiplexer for receiving said first pump light emitted by said first pump light sources at plural input ports, so as to generate first wavelength multiplexed pump light by wavelength multiplexing said first pump light and output said first wavelength multiplexed pump light from an output port;

a second wavelength multiplexer for receiving said first wavelength multiplexed pump light at a first input port and receiving signal light at a second input port, so as to generate coupled light by coupling said first wavelength multiplexed pump light and said signal light and output said coupled light from an output port;

a rare earth-doped optical fiber for receiving said coupled light output from said output port of said second wavelength multiplexer at a first end and outputting said coupled light from a second end;

a third wavelength multiplexer for receiving said second pump light emitted by said second pump light sources at plural input ports, so as to generate second wavelength multiplexed pump light by wavelength multiplexing said second pump light and output said second wavelength multiplexed pump light from an output port; and a fourth wavelength multiplexer for receiving said second wavelength multiplexed pump light at a first input port and inputting said second wavelength multiplexed pump light to said second end of said rare earth-doped optical fiber, wherein at least one of said first pump light sources is a narrow-linewidth light source for emitting light with a laser linewidth of approximately 5 nm or less as said first pump light, and at least one of said second pump light sources is a narrow-linewidth light source for emitting light with a laser linewidth of approximately 5 nm or less as said second pump light.

9. A semiconductor laser module for optical pumping comprising:

plural narrow-linewidth light sources for emitting pump light;

plural filters for wavelength multiplexing said pump light emitted by said narrow-linewidth light sources; and an optical fiber for receiving said pump light through said filters and outputting wavelength multiplexed pump light from one end, said plural filters being slantly buried in said optical fiber, wherein each of said narrow-linewidth light sources emits light with a laser linewidth of approximately 5 nm or less as said pump light.

10. The semiconductor laser module for optical pumping of claim 9, further comprising a substrate for supporting said narrow-linewidth light sources and said optical fiber, wherein said substrate has a relatively large groove for receiving said optical fiber and relatively small grooves for receiving said filters.

11. The semiconductor laser module for optical pumping of claim 9, wherein said narrow-linewidth light sources include four or more narrow-linewidth semiconductor lasers having different oscillation wavelengths.

12. The semiconductor laser module for optical pumping of claim 9, wherein said rare earth-doped fiber is an erbium-doped fiber, and said narrow-linewidth light sources include four semiconductor lasers for respectively emitting light having central wavelengths of approximately 1460 nm, approximately 1470 nm, approximately 1480 nm and approximately 1490 nm.

13. The semiconductor laser module for optical pumping of claim 9, wherein said narrow-linewidth light sources include a distributed feedback semiconductor laser.

14. The semiconductor laser module for optical pumping of claim 9, wherein a number of said narrow-linewidth light sources is in the range between approximately 30 and approximately 150.

15. An optical fiber amplifier comprising:

a semiconductor laser module for optical pumping which emits wavelength multiplexed pump light;

a wavelength multiplexer for receiving said wavelength multiplexed pump light emitted by said semiconductor laser module for optical pumping at a first input port and receiving signal light at a second input port, so as to generate coupled light by coupling said wavelength multiplexed pump light and said signal light and output said coupled light from an output port; and a rare earth-doped optical fiber for receiving said coupled light emitted from said output port of said wavelength multiplexer and amplifying said coupled light, wherein said semiconductor laser module for optical pumping includes:

plural narrow-linewidth light sources for emitting pump light;

plural filters for wavelength multiplexing said pump light emitted by said narrow-linewidth light sources; and an optical fiber for receiving said pump light through said filters and outputting said wavelength multiplexed pump light from one end, said filters being slantly buried in said optical fiber, and each of said narrow-linewidth light sources emits light with a laser linewidth of approximately 5 nm or less as said pump light.

16. An optical communication system comprising:

an optical signal transmitter for outputting an optical signal;

an optical fiber amplifier for amplifying said optical signal; and an optical signal receiver for receiving said optical signal having been amplified by said optical fiber amplifier, wherein said optical fiber amplifier includes:

plural pump light sources for emitting pump light;

a first wavelength multiplexer for receiving said pump light emitted by said pump light sources at plural input ports and for wavelength multiplexing said received pump light, so as to generate wavelength multiplexed pump light and output said wavelength multiplexed pump light from an output port;

a second wavelength multiplexer for receiving said wavelength multiplexed pump light at a first input port and receiving signal light at a second input port, so as to generate coupled light by coupling said wavelength multiplexed pump light and said signal light and output said coupled light from an output port; and a rare earth-doped optical fiber for receiving said coupled light output from said output port of said second wavelength multiplexer and amplifying said coupled light, and at least one of said pump light sources is a narrow-linewidth light source for emitting light with a laser linewidth of approximately 5 nm or less as said pump light.

17. An optical communication system comprising:

an optical signal transmitter for outputting an optical signal;

an optical fiber amplifier for amplifying said optical signal; and an optical signal receiver for receiving said optical signal having been amplified by said optical fiber amplifier, wherein said optical fiber amplifier includes:

a semiconductor laser module for optical pumping which emits wavelength multiplexed pump light;

a wavelength multiplexer for receiving said wavelength multiplexed pump light emitted by said semiconductor laser module for optical pumping at a first input port and receiving signal light at a second input port, so as to generate coupled light by coupling said wavelength multiplexed pump light and said signal light and output said coupled light from an output port; and a rare earth-doped optical fiber for receiving said coupled light output from said output port of said wavelength multiplexer and amplifying said coupled light, and said semiconductor laser module for optical pumping includes:

plural narrow-linewidth light sources for emitting pump light;

plural filters for wavelength multiplexing said pump light emitted by said narrow-linewidth light sources; and an optical fiber for receiving said pump light through said filters and outputting said wavelength multiplexed pump light from one end, said filters being slantly buried in said optical fiber, and each of said narrow-linewidth light sources emits light with a laser linewidth of approximately 5 nm or less as said pump light.

* * * * *